(12) United States Patent
Hideta

(10) Patent No.: US 8,393,830 B2
(45) Date of Patent: Mar. 12, 2013

(54) CYLINDRICAL ROTATING TOOL WITH INTERNAL FLUID PASSAGE AND MACHINING METHOD USING THE SAME

(75) Inventor: Morihiro Hideta, Nara (JP)

(73) Assignee: Mori Seki Co., Ltd., Yamatokoriyama-shi (JP)

( * ) Notice: Subject to any disclaimer, the term of this patent is extended or adjusted under 35 U.S.C. 154(b) by 366 days.

(21) Appl. No.: 12/882,603

(22) Filed: Sep. 15, 2010

(65) Prior Publication Data

US 2011/0076105 A1    Mar. 31, 2011

(30) Foreign Application Priority Data

Sep. 25, 2009  (JP) .................................. 2009-221385
May 18, 2010  (JP) .................................. 2010-114272

(51) Int. Cl.
*B23B 27/10* (2006.01)
*B26D 7/18* (2006.01)
(52) U.S. Cl. .......................................... 408/56; 407/11
(58) Field of Classification Search .................. 407/11; 408/56, 57, 59, 226; 82/50, 901
See application file for complete search history.

(56) References Cited

U.S. PATENT DOCUMENTS

| 4,072,438 | A | * | 2/1978 | Powers ............................ 408/59 |
| 4,606,680 | A | * | 8/1986 | Striegl ............................ 408/156 |
| 4,669,933 | A | * | 6/1987 | Dye ................................ 409/136 |
| 4,795,292 | A | * | 1/1989 | Dye ................................ 409/136 |
| 5,378,091 | A | * | 1/1995 | Nakamura ..................... 409/132 |
| 7,476,067 | B2 | * | 1/2009 | Borschert et al. ................ 408/59 |
| 7,556,458 | B2 | * | 7/2009 | Heilmann et al. ............... 408/59 |
| 2005/0169718 | A1 | * | 8/2005 | Beckington ..................... 408/61 |
| 2007/0081867 | A1 | * | 4/2007 | Murakami et al. .............. 407/11 |
| 2009/0142150 | A1 | * | 6/2009 | Chu ................................ 408/59 |

FOREIGN PATENT DOCUMENTS

| JP | 7-51982 | 2/1995 |
| JP | 2007-313574 A1 | 12/2007 |
| WO | WO 2005/021191 A2 | 3/2005 |

* cited by examiner

*Primary Examiner* — Will Fridie, Jr.
(74) *Attorney, Agent, or Firm* — Kratz, Quintos & Hanson, LLP

(57) ABSTRACT

A cylindrical rotating tool comprises a major diameter portion having formed therein an internal fluid passage, a minor diameter portion provided in front of the major diameter portion, and a tip attached to the front of the minor diameter portion. When seen from behind the central axis line, an inner circumference of an outlet of the internal fluid passage intersects with an outer circumference of the minor diameter portion. At the site of the outlet, a notch is formed on an outer circumferential surface of the minor diameter portion. An inclined portion of the notch is formed obliquely so that the distance from the central axis line to the inclined portion on further forward of the minor diameter portion becomes larger than the distance from the central axis line to the inclined portion on a closest position on the entire circumference of the outlet to the central axis line. The inclined portion guides a partial flow of the coolant, gushing forward from the outlet, outward in a radial direction of the minor diameter portion. Accordingly, the coolant ejected forward from the outlet flows over the outer circumferential surface of the tool, spreading like a curved fan without diffusing outward in the radial direction, and is supplied to the tip, whereby the outer circumferential surface of the tool and the tip are cooled.

8 Claims, 12 Drawing Sheets

CYLINDRICAL ROTATING TOOL WITH INTERNAL FLUID PASSAGE AND MACHINING METHOD USING THE SAME

BACKGROUND OF THE INVENTION

1. Field of the Invention

The present invention relates to a cylindrical rotating tool, having internal fluid passage, which is attached to a machine tool to machine a workpiece, and a machining method using the tool.

2. Description of the Related Art

Japanese published patent No. 7-051982 describes a technology in which a tool or workpiece is cooled or lubricated by attaching a coolant nozzle to a rotating tool and by spraying coolant (cutting fluid) on a machining point of the tool from the coolant nozzle.

The rotating tool described in Japanese published patent No. 7-051982 may have the coolant nozzle attached thereto for spraying the coolant. A strong centrifugal force acts on the rotating tool, which is usually rotating at high speed (e.g., 2,000 to 10,000 $min^{-1}$).

Therefore, it is difficult to supply sufficient coolant to an outer circumferential surface and the machining point of the tool from a place distant from the outer circumferential surface of the tool. In addition, it is necessary to attach the coolant nozzle to the tool as a separate component. As a result, the structure of the tool may become complicated and there is a risk that the separate component causes physical interference when moving the tool for tool change or machining.

As another background art, for example, end mills or drills among rotating tools may have an internal fluid passage formed therein for allowing the coolant to flow (Japanese published patent No. 2007-313574).

However, cooling effect has been low due to difficulty of sufficiently supplying the coolant ejected from the internal fluid passage to the outer circumferential surface of the tool and the machining point of a cutting edge.

SUMMARY OF THE INVENTION

Having been conceived to solve the above problems, it is an object of the present invention to provide a cylindrical rotating tool with internal fluid passage and a machining method using the tool, which can effectively cool the outer circumferential surface of the tool and the tip, by allowing the coolant ejected forward from an outlet of the internal fluid passage to flow over the outer circumferential surface of the tool, spreading like a curved fan without diffusing outward in the radial direction, and to be supplied to the tip.

To achieve the above-mentioned object, a cylindrical rotating tool with internal fluid passage according to an aspect of the present invention comprises: a major diameter portion having at least one internal fluid passage for allowing coolant to flow, a minor diameter portion provided in front of the major diameter portion, and a tip attached to the front of the minor diameter portion, the tool having a cylindrical shape centered about a central axis line, wherein when seen from behind the central axis line, an inner circumference of an outlet of the internal fluid passage intersects with an outer circumference of the minor diameter portion, at the site of the outlet, a notch is formed on an outer circumferential surface of the minor diameter portion, the notch has an inclined portion provided at the front of the outlet, the inclined portion is formed obliquely so that the distance from the central axis line to the inclined portion on further forward of the minor diameter portion becomes larger than the distance from the central axis line to the inclined portion on a closest position on the entire circumference of the outlet to the central axis line, and the inclined portion guides a partial flow of the coolant, gushing forward from the outlet, outward in a radial direction of the minor diameter portion.

Preferably, the coolant gushing forward from the outlet of the internal fluid passage is divided into main coolant with a larger amount flowing at an outer position in the radial direction of the tool, and sub-coolant with a smaller amount flowing at an inner position in the radial direction of the tool to be guided by the inclined portion, the main coolant flows in the direction of the tip approximately parallel to the central axis line, and the sub-coolant is guided by the inclined portion to change the direction of flow to outward in the radial direction of the minor diameter portion, and collides with the main coolant so that the sub-coolant is bounced back by the main coolant and flows over the outer circumferential surface of the minor diameter portion, spreading like a curved fan without diffusing outward in the radial direction of the minor diameter portion, and is supplied to the tip.

Preferably, the major diameter portion has three of the internal fluid passages formed therein, which are uniformly located in the circumferential direction centered about the central axis line, at the site of each of the outlet of the internal fluid passage, the notch is formed on the outer circumferential surface of the minor diameter portion, and the notch has an inclined surface which composes the inclined portion and which is provided at the front of the outlet.

Preferably, the inclined surface composing the inclined portion is formed in a planar or a groove-like shape.

A rotating workpiece is machined using the tool.

Preferably, the tip having a face has at least one face outlet, which is formed at a front end of the tip and is in communication with the internal fluid passage and is opened outward in the radial direction of the tip, and a face coolant ejected outward in the radial direction of the tip at the face outlet is supplied to at least a machining point on the face.

Preferably, the tip has a fastener provided at the center of the front end of the tip in order to fasten the tip to the minor diameter portion, the fastener has a plurality of the face outlets which are uniformly formed in the circumferential direction about the central axis, and an internal sub-fluid passage is formed inside each of the minor diameter portion and the fastener for allowing the face coolant to flow from the internal fluid passage of the major diameter portion to the face outlet of the tip.

To achieve the above-mentioned object, a machining method using a cylindrical rotating tool according to an aspect of the present invention comprises: a step of machining a workpiece by rotating above-described cylindrical rotating tool.

The method rotates the tool to machine a non-rotating workpiece (or a rotating workpiece).

A "cylindrical rotating tool" in the present invention refers to a cylindrical tool which rotates about a central axis line. The workpiece to be machined by the cylindrical rotating tool may be either rotating or non-rotating.

Because the cylindrical rotating tool having the internal fluid passage and the machining method using the tool according to the present invention are configured as describe above, the coolant ejected forward from the outlet of the internal fluid passage flows over the outer circumferential surface of the tool, spreading like a curved fan without diffusing outward in the radial direction, and is supplied to the tip. Therefore, the outer circumferential surface of the tool and the tip are effectively cooled.

BRIEF DESCRIPTION OF THE DRAWINGS

FIGS. 1B to 6 depict a second embodiment of the present invention and FIG. 1B is a schematic explanatory view illustrating a rotating workpiece being machined by a cylindrical rotating tool;

FIG. 2 is a perspective view of the cylindrical rotating tool;

FIG. 3 is a transparent perspective view of the cylindrical rotating tool;

FIG. 4 is an enlarged cross-sectional view taken along line IV of FIG. 3;

FIG. 5 is a cross-sectional view taken along line V-V of FIG. 4;

FIG. 6 is a perspective view, which is equivalent to FIG. 2, of a cylindrical rotating tool according to an exemplary variation of the second embodiment;

FIG. 7 is a perspective view of a cylindrical rotating tool, which is equivalent to FIG. 2;

FIG. 8 is a perspective view of the cylindrical rotating tool, which is equivalent to FIG. 3;

FIG. 9 is an enlarged view showing the workpiece being machined by the cylindrical rotating tool;

DESCRIPTION OF THE PREFERRED EMBODIMENTS

The cylindrical rotating tool with internal fluid passage according to the present invention comprises a major diameter portion having formed therein at least one internal fluid passage for allowing coolant to flow, a minor diameter portion provided in front of the major diameter portion, and a tip attached to the front of the minor diameter portion. The tool has a cylindrical shape centered about a central axis line. When seen from behind the central axis line of the tool, an inner circumference of an outlet of the internal fluid passage intersects with an outer circumference of the minor diameter portion.

At the site of the outlet, a notch is formed on an outer circumferential surface of the minor diameter portion. The notch has an inclined portion provided at the front of the outlet. The inclined portion is formed obliquely so that the distance from the central axis line to the inclined portion on further forward of the minor diameter portion becomes larger than the distance from the central axis line to the inclined portion on a closest position on the entire circumference of the outlet to the central axis line. The inclined portion guides a partial flow (sub-coolant described below) of the coolant, gushing forward from the outlet, outward in a radial direction of the minor diameter portion.

Accordingly, the coolant ejected forward from the outlet of the internal fluid passage flows over the outer circumferential surface of the tool, spreading like a curved fan (that is, like a curved strip gradually spreading wider as it flows further frontward the tool) without diffusing outward in the radial direction, and is supplied to the tip. As a result, the object of effectively cooling the outer circumferential surface of the tool and the tip is achieved.

The cylindrical rotating tool according to the present invention is a tool used in a machine tool such as a multi-axis turning center, a lathe and a turning center, other than a tool used in a machining center.

Figure 1A:
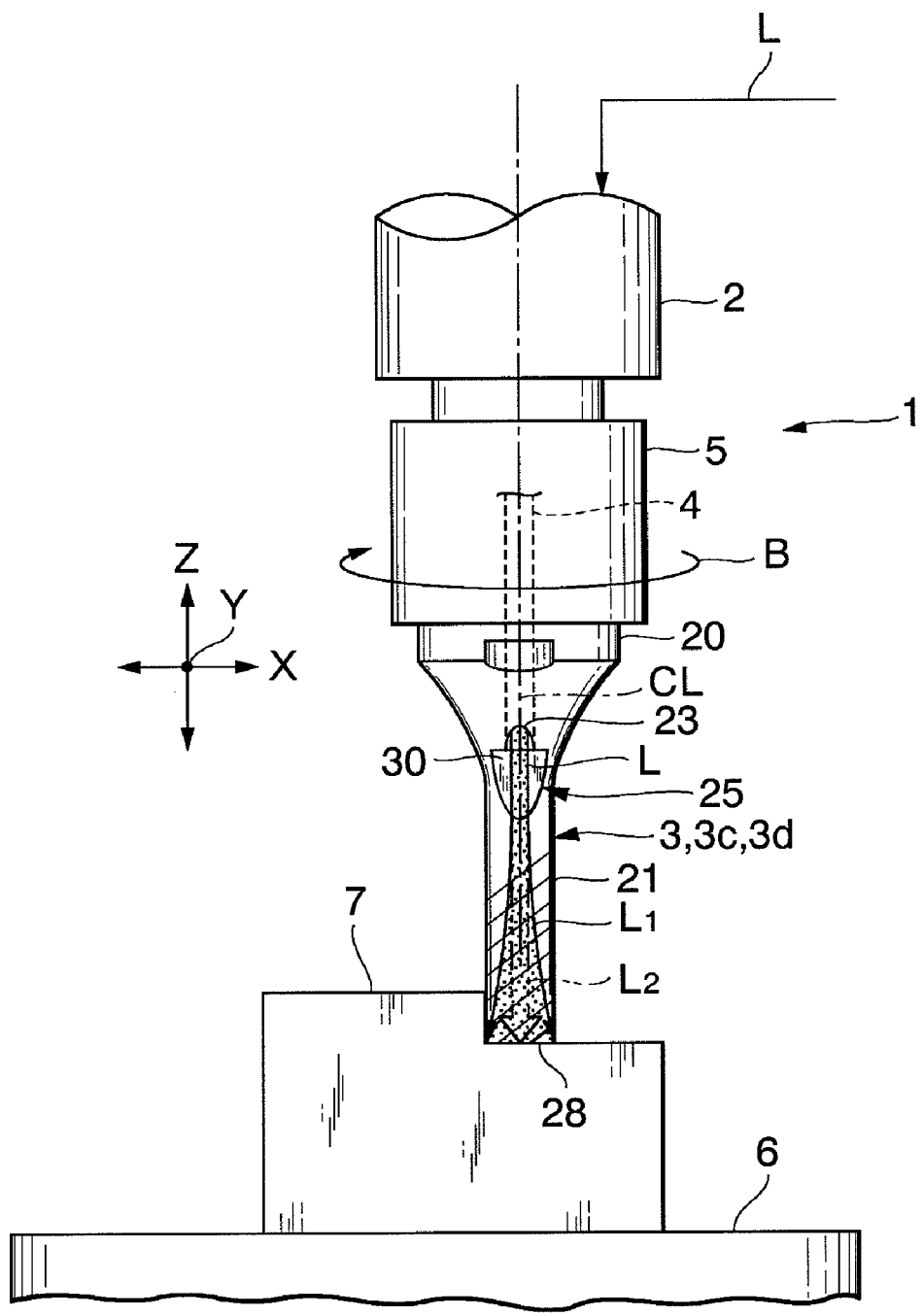
FIG. 1A, depicting a first embodiment of the present invention, is a schematic explanatory view illustrating a non-rotating workpiece being cut by a cylindrical rotating tool.

Embodiments according to the present invention will be described below, referring to FIGS. 1A to 11. FIG. 1A depicts a first embodiment, FIGS. 1B to 6 depict a second embodiment, and FIGS. 7 to 11 depict a third embodiment.

First Embodiment

FIG. 1A is a schematic explanatory view illustrating a non-rotating workpiece being cut by a cylindrical rotating tool.

In FIG. 1A, a machine tool 1 according to the first embodiment is a machining center. A spindle head of the machine tool 1 rotatably supports a main spindle 2. The cylindrical rotating tool (hereinafter referred to as "tool") 3 has internal fluid passage (hereinafter referred to as "fluid passage") 4. The first embodiment provides a case in which the tool 3 is an end mill, which is a kind of a cylindrical rotating tool.

The tool 3 is mounted on a tool holder 5 removably attached to the main spindle 2. The main spindle 2 is controlled to move along three perpendicular axes (X, Y and Z axes) relatively to a workpiece 7 on a table 6. The workpiece 7 mounted on the table 6 is then cut by rotating the tool 3 as indicated by an arrow B.

Here, in the tool 3 (and cylindrical rotating tool 3a, 3b, 3c, 3d described below), the direction and the opposite direction of the main spindle 2 are referred to as behind and forward, respectively.

The tool 3 comprises a major diameter portion 20, a minor diameter portion 21 and a tip 28, and has a cylindrical shape centered about a central axis line CL. Inside the major diameter portion 20, at least one (three in this embodiment) fluid passage 4 for allowing the coolant L to flow is formed in parallel with the central axis line CL. The coolant L may be, as exemplary variations other than liquid cutting oil, misty cutting oil or cooling air used for near dry machining.

Figure 5:
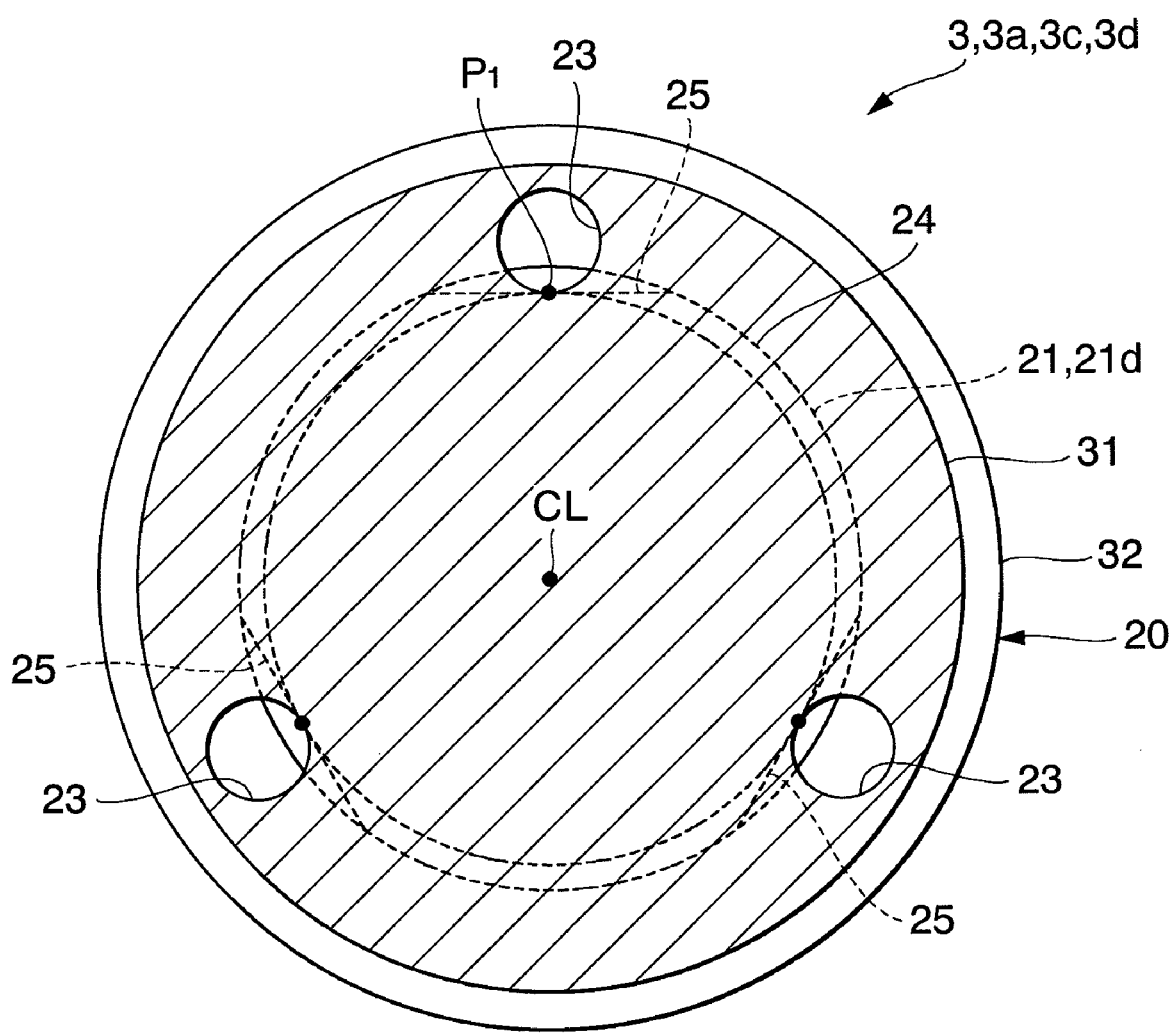

The minor diameter portion 21 is provided in front of the major diameter portion 20. The tip 28 is attached to the front of the minor diameter portion 21. When seen from behind the central axis line CL, an inner circumference of an outlet 23 of the fluid passage 4 intersects with an outer circumference 24 of the minor diameter portion 21 (FIG. 5).

At the site of the outlet 23, a notch 25 is formed on the outer circumferential surface of the minor diameter portion 21. The notch 25 has an inclined portion 30 provided at the front of the outlet 23. The inclined portion 30 is formed obliquely so that the distance from the central axis line CL to the inclined portion 30 on further forward of the minor diameter portion 21 becomes larger than the distance from the central axis line CL to the inclined portion 30 on a closest position P1 (FIG. 2) on the entire circumference of the outlet 23 to the central axis line CL. The inclined portion 30 guides a partial flow (flow of sub-coolant L1 described below) of the coolant L, gushing forward from the outlet 23, outward in the radial direction of the minor diameter portion 21.

Accordingly, the coolant (the sub-coolant L1 which is a part of the coolant L) ejected forward from the outlet 23 of the fluid passage 4 flows over the outer circumferential surface of the tool 3, spreading like a curved fan without diffusing outward in the radial direction, and is supplied to the tip 28.

In the present invention, the "curved fan-like manner" refers to a curved strip-shaped manner gradually, spreading wider as it flows in front of the tool 3 (or tools 3a, 3b and 3c described below).

Therefore, the outer circumferential surface of the tool 3 and the tip 28 are effectively cooled. Because it suffices to form the notch 25 on the outer circumferential surface of the minor diameter portion 21, it is not necessary to attach a separate component such as the coolant nozzle or the like which has been used in the technology of the Japanese published patent No. 7-051982 to the tool. As a result, there is no risk that the separate component of the tool causes physical interference. Because the coolant L with a sufficient amount of flow is supplied to the tip 28, effective cooling performance and lubrication performance are exerted by the coolant L.

According to the present invention, the coolant L gushing forward from the outlet 23 of the fluid passage 4 is divided by the inclined portion 30 into main coolant L2 and sub-coolant L1. Although the main coolant L2 and the sub-coolant L1 are, as a whole, a single flow in the fluid passage 4, they are divided into different flows after having been discharged from the outlet 23, due to existence of the inclined portion 30.

The main coolant L2 is a portion with a larger amount flowing at an outer position (i.e., a position far from the central axis line CL) in the radial direction of the tool 3. The main coolant L2 flows in the direction of the tip 28, approximately parallel to the central axis line CL.

The sub-coolant L1 is a portion with a smaller amount flowing at an inner position (i.e., a position close to the central axis line CL) in the radial direction of the tool 3, and is guided by the inclined portion 30 to change the direction of flow.

The sub-coolant L1 of the coolant L ejected forward from the outlet 23 is guided by the inclined portion 30 to flow along the inclined portion 30. Because the main coolant L2 flowing outside the sub-coolant L1 flows outside the position of the inclined portion 30, the main coolant L2 flows approximately straightforwardly without being influenced by the inclined portion 30.

The sub-coolant L1 is guided by the inclined portion 30 to change the direction of flow to outward in the radial direction of the minor diameter portion 21, and collides with the main coolant L2. However, for the sub-coolant L1 with a smaller amount of flow (i.e., momentum and kinetic energy), the main coolant L2 with a larger amount of flow (i.e., momentum and kinetic energy) exists just like a wall.

As a result, the sub-coolant L1 collides with the main coolant L2 and is bounced back. The sub-coolant L1 then flows over the outer circumferential surface of the minor diameter portion 21, spreading in a lateral direction like a curved fan without diffusing outward in the radial direction of the minor diameter portion 21 any more, and is supplied to the tip 28. Accordingly, a wide, curved and fan-like area of the sub-coolant L1 contacts with the outer circumferential surface of the minor diameter portion 21 and the tip 28, thereby cooling the minor diameter portion 21 and the tip 28.

On the other hand, the main coolant L2 ejected forward from the outlet 23 slightly changes the direction of flow by colliding with the sub-coolant L1. However, the amount of flow (momentum and kinetic energy) of the main coolant L2 is larger than the amount of flow (momentum and kinetic energy) of the sub-coolant L1.

Therefore, the main coolant L2 flows forward along the outer circumferential surface of the minor diameter portion 21 without significantly changing the direction of flow.

The operation of machining the workpiece 7 using the tool 3 will be described next.

First, the tool 3 is attached to the tool holder 5 and the holder 5 is then mounted on the main spindle 2. The main spindle 2 is rotationally driven to rotate the tool 3 together with the holder 5. The workpiece 7 placed on the table 6 is in a non-rotating state.

A device for supplying the coolant L has been preliminarily set to an operating state and supplies the coolant L to the fluid passage 4 of the tool 3 via the main spindle 2 and the holder 5. In this state, the main spindle 2 is moved in the directions of the three perpendicular axes (X, Y and Z axes) relatively to the workpiece 7. The workpiece 7 is then cut by the rotating tool 3.

While cutting, the coolant L flows through each of the three internal fluid passages 4 formed in the major diameter portion 20 and gushes from each outlet 23. The coolant L ejected forward from the outlet 23 is divided into the main coolant L2 and the sub-coolant L1 due to existence of the inclined portion 30 of the notch 25.

Because the main coolant L2 with a larger amount of flow at an outer position in the radial direction of the tool 3 is not affected by the inclined portion 30, the main coolant L2 flows in the direction of the tip 28 approximately parallel with the central axis line CL.

On the contrary, the sub-coolant L1 with a smaller amount of flow at an inner position in the radial direction of the tool 3 is guided by the inclined portion 30 to change the direction of flow to outward in the radial direction of the minor diameter portion 21. In other words, the inclined portion 30, working similarly to a jump platform, ejects the sub-coolant L1 outward from the minor diameter portion 21.

The sub-coolant L1 ejected outward collides with the main coolant L2 flowing immediately outside thereof with a larger amount of flow. However, because the main coolant L2 has a larger amount of flow than the sub-coolant L1, its momentum and kinetic energy are also larger. As a result, the main coolant L2, working as the wall blocking the flow of the sub-coolant L1, bounces back the sub-coolant L1.

The sub-coolant L1 collided with and bounced back by the main coolant L2 spreads along the outer circumferential surface of the minor diameter portion 21 like a curved fan without diffusing outward in the radial direction of the minor diameter portion 21 any more.

As thus described, the sub-coolant L1 flows over the outer circumferential surface of the minor diameter portion 21, spreading like a curved fan, and is supplied to the tip 28. The main coolant L2 discharged from the outlet 23 also flows over the outer circumferential surface of the minor diameter portion 21, and is supplied to the tip 28.

As a result, the outer circumferential surface of the minor diameter portion 21 and the tip 28 are cooled by the sub-coolant L1 and the main coolant L2. The three outlets 23 are formed on the tool 3 and the coolant gushes from each outlet 23. Accordingly, three streams of the sub-coolant L1 are uniformly and sufficiently supplied on the outer circumferential surface of the minor diameter portion 21 and the tip 28. Therefore, the entire outer circumferential surface of the minor diameter portion 21 and the entire tip 28 are effectively and uniformly cooled.

Second Embodiment

Figure 1B:
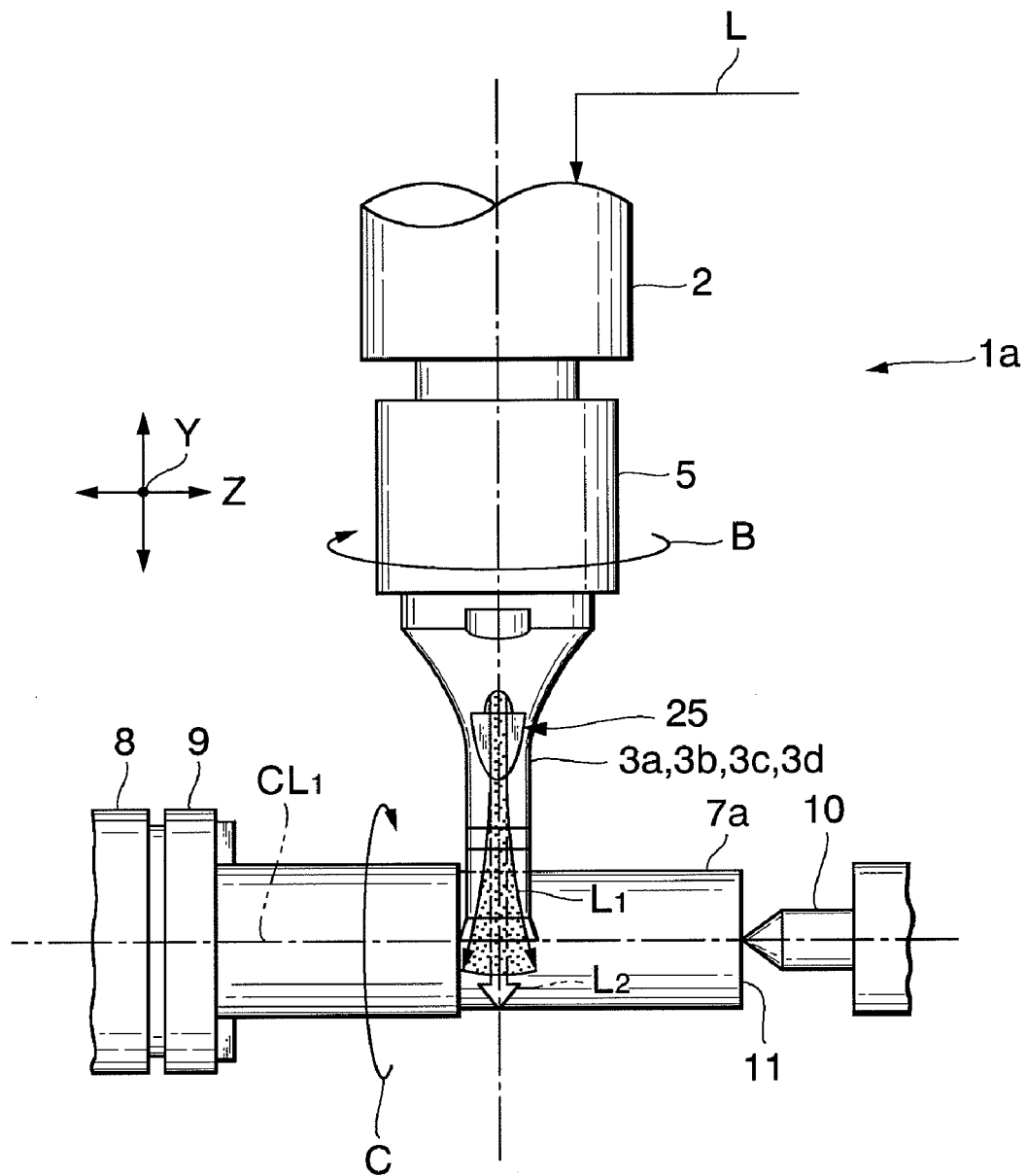
Figure 2:
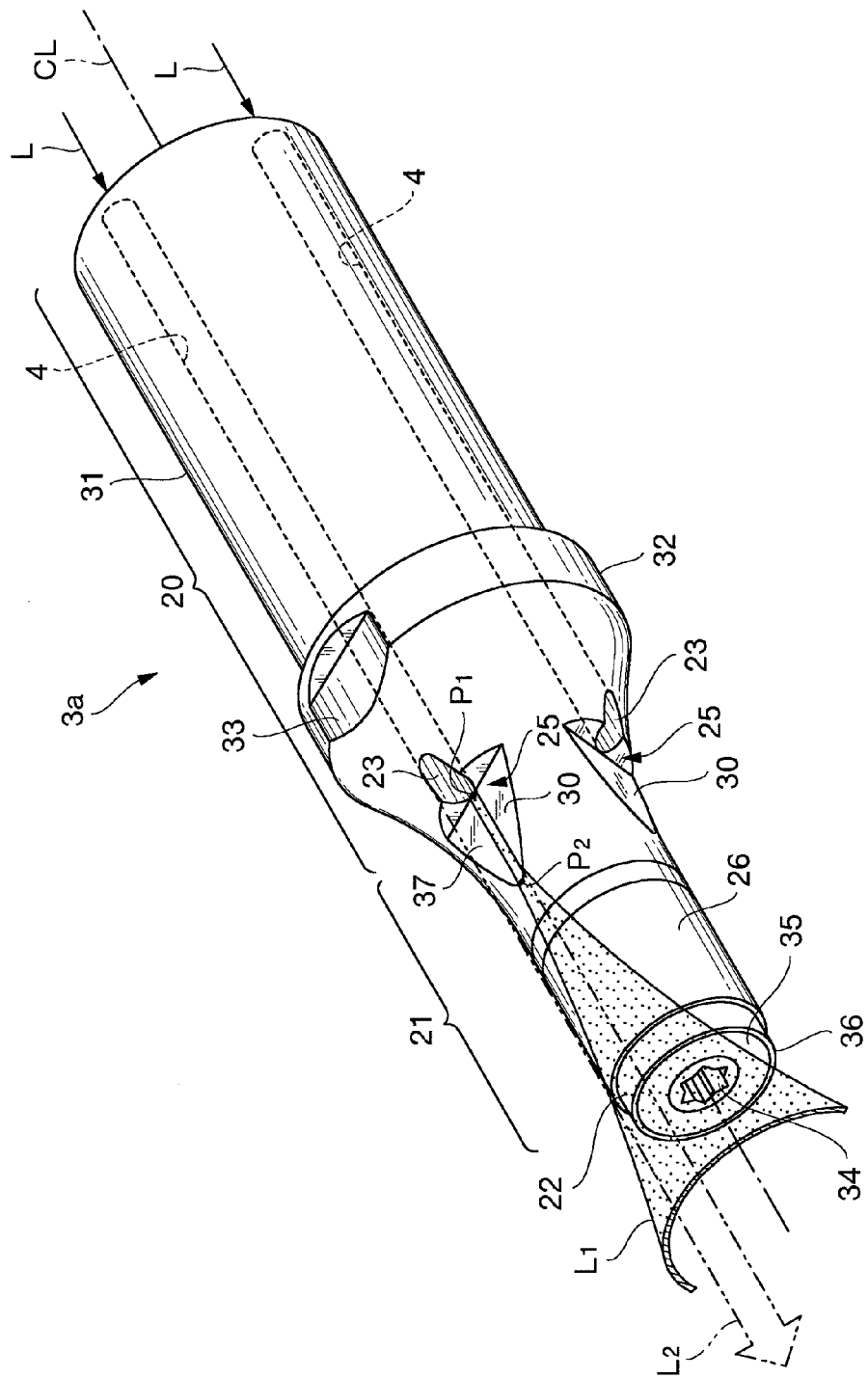
Figure 3:
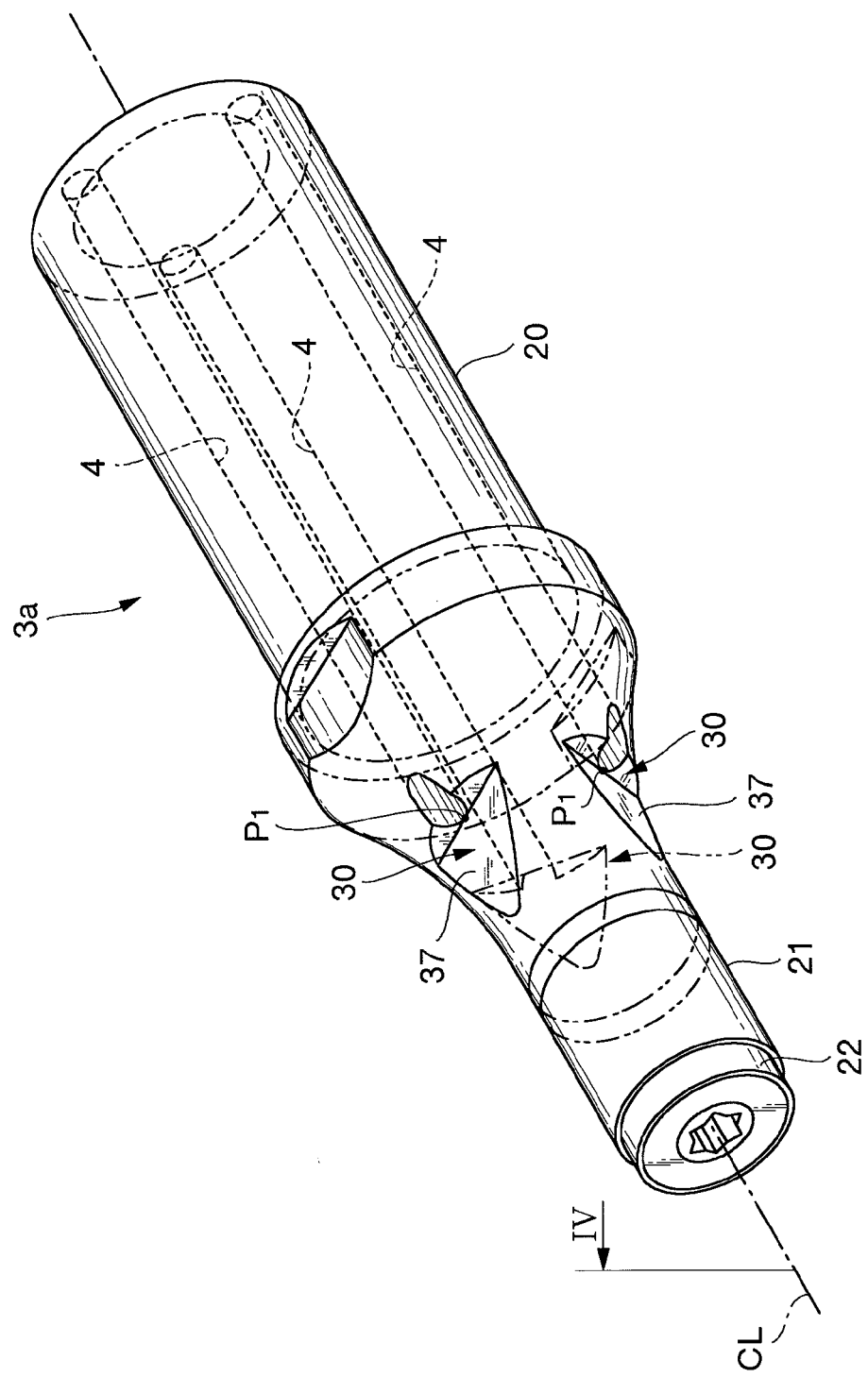
Figure 4:
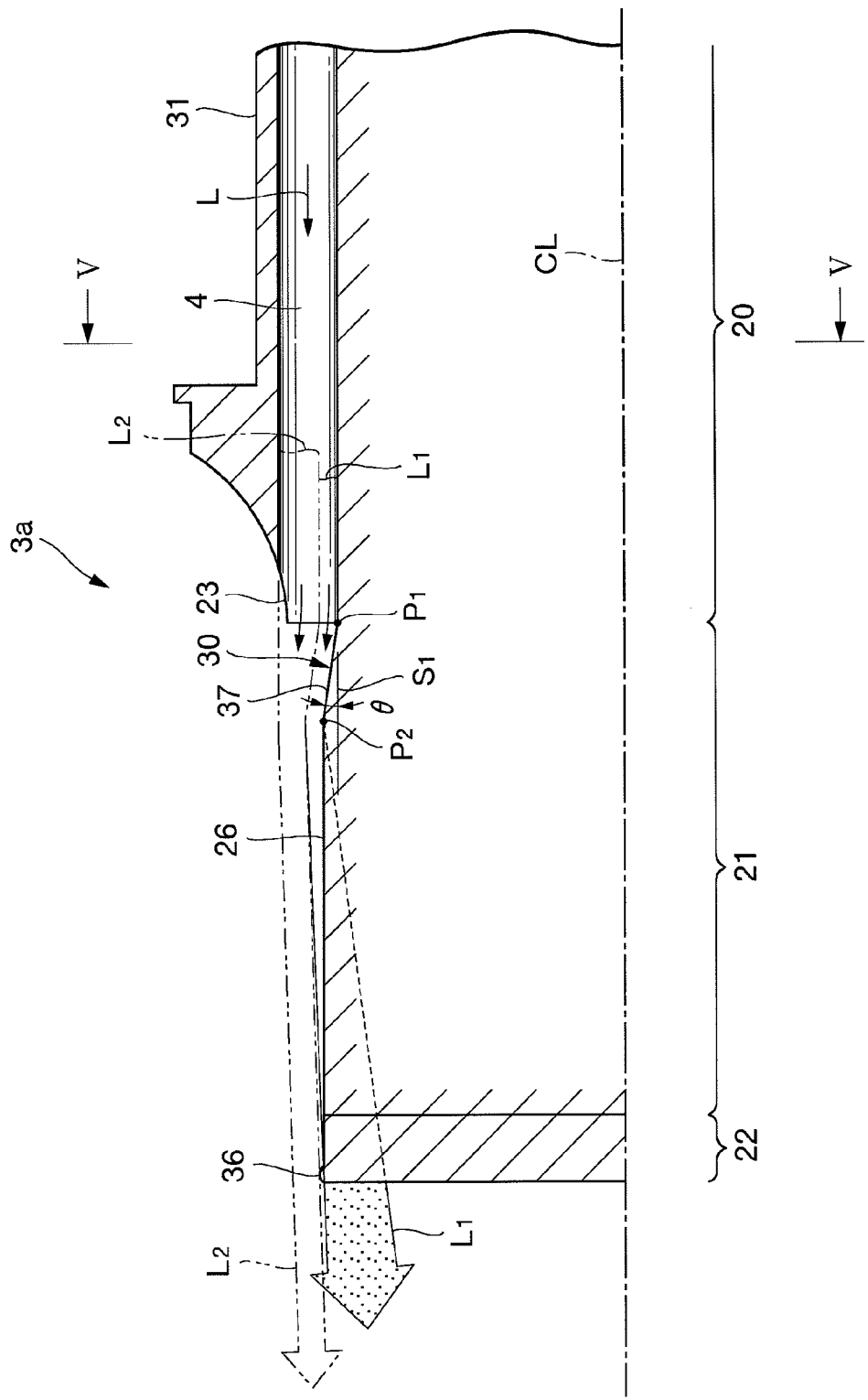

FIG. 1b is a Schematic Explanatory View Illustrating a Rotating workpiece 7a being machined by a cylindrical rotating tool (hereinafter referred to as "tool") 3a or 3b. FIGS. 2 and 3 are respectively a perspective view and a transparent perspective view of the tool 3a, FIG. 4 is an enlarged cross-sectional view taken along line IV of FIG. 3, and FIG. 5 is a cross-sectional view taken along line V-V of FIG. 4.

As shown in FIG. 1B, a machine tool 1a, rotating the tool 3a (or 3b) as indicated by arrow B, machines a rotating workpiece 7a as indicated by arrow C. The machine tool 1a is a multi-axis turning center with a lathe as the basic structure. In addition to a headstock 8 which rotatably supports the workpiece 7a, the machine tool 1a has the main spindle 2 which rotates while supporting the tool 3a or 3b.

The workpiece 7a is grasped and rotated by a chuck 9 rotationally driven by the headstock 8. An end portion 11 of the workpiece 7a is supported by a center 10 in a freely rotatable manner. The main spindle 2 is controlled to move in the Z-axis direction parallel to the central axis line CL1 of headstock 8 and the Y-axis direction perpendicular to the Z-axis direction, respectively.

While machining, the main spindle 2 is driven to rotate the tool 3a or 3b, and the headstock 8 is driven to rotate the workpiece 7a. The main spindle 2 is then controlled to move in the directions of the two perpendicular axes (directions of Z-axis and Y-axis).

In this manner, the workpiece 7a is machined by the tool 3a or 3b. Because the tools 3a and 3b have the coolant L supplied thereto, the tools 3a and 3b are cooled by the coolant L.

As shown in FIGS. 1B to 5, the tool 3a comprises the major diameter portion 20, the minor diameter portion 21 and a tip 22, and has a cylindrical shape centered about a central axis line CL. Inside the major diameter portion 20, at least one (three in this embodiment) fluid passage 4 for allowing the coolant L to flow is formed in parallel with the central axis line CL.

The minor diameter portion 21 is provided in front of the major diameter portion 20. The tip 22 is attached to the front of the minor diameter portion 21. When seen from behind the central axis line CL, the inner circumference of the outlet 23 of the fluid passage 4 intersects with the outer circumference 24 of the minor diameter portion 21 (FIG. 5).

When seen from behind the central axis line CL, the entire cross section of the fluid passage 4 is open forward at the outlet 23. At the outlet 23, a predetermined position P1 on the inner circumferential surface is the point closest to the central axis line CL.

At the site of the outlet 23, the notch 25 is formed on the outer circumferential surface 26 of the minor diameter portion 21. The notch 25 has the inclined portion 30 provided at the front of the outlet 23. The inclined portion 30 is formed obliquely so that the distance from the central axis line CL to the inclined portion 30 on further forward of the minor diameter portion 21 becomes larger than the distance from the central axis line CL to the inclined portion 30 on a closest position P1 on the entire circumference of the outlet 23 to the central axis line CL. The inclined portion 30 guides a partial flow (flow of the sub-coolant L1) of the coolant L, gushing forward from the outlet 23, outward in the radial direction of the minor diameter portion 21.

Therefore, the coolant (the sub-coolant L1 which is a part of the coolant L) ejected forward from the outlet 23 of the fluid passage 4 flows over the outer circumferential surface 26 of the tool (the minor diameter portion 21 of the tool 3a), spreading like a curved fan without diffusing outward in the radial direction, and is supplied to the tip 22. Accordingly, the outer circumferential surface 26 of the tool (the minor diameter portion 21 of the tool 3a) and the tip 22 are effectively cooled.

Because it suffices to form the notch 25 on the outer circumferential surface 26 of the minor diameter portion 21, it is not necessary to attach the separate component such as the coolant nozzle or the like which has been used in the technology of the Japanese published patent No. 7-051982 to the tool. As a result, there is no risk that the separate component of the tool causes physical interference. Additionally, because the coolant L with a sufficient amount of flow is supplied to the tip 22, effective cooling performance and lubrication performance are exerted by the coolant L.

The major diameter portion 20 has a shank 31 and a flange 32, and is cylindrically shaped and is centered about a central axis line CL. The shank 31, having a larger diameter than the minor diameter portion 21, is mounted on the holder 5.

The flange 32 is integrally (or separately) fixed to the shank 31 and is used for operation of positioning the tool 3a on the tool holder 5. An operating portion 33 of the flange 32 has a planar portion formed thereon to be used when rotating the tool 3a about the central axis line CL.

The minor diameter portion 21, which is integrally (or separately) fixed to the major diameter portion 20, has a cylindrical shape and is centered about the central axis line CL. The minor diameter portion 21 is a main body for supporting the tip 22 to be removably attached to the front thereof.

The portion from the front of the flange 32 to the back of the minor diameter portion 21 is approximately conical. The outer circumferential surface of the portion is a curve slightly dented relative to the cone.

The tip 22 is provided concentrically with the minor diameter portion 21 and is fastened to a mounting part at the front of the minor diameter portion 21 with a screw 34. The tip 22, which is annular-shaped, machines the workpiece 7a with a cutting edge 36 on the outer circumferential edge of its front end surface 35.

In the present invention, the coolant L gushing forward from the outlet 23 of the fluid passage 4 is divided by the inclined portion 30 into the main coolant L2 and the sub-coolant L1. Although the main coolant L2 and the sub-coolant L1 are, as a whole, a single flow in the fluid passage 4, they are separated into different flows after having been discharged from the outlet 23, due to existence of the inclined portion 30.

The main coolant L2 is a portion with a larger amount flowing at an outer position (i.e., a position far from the central axis line CL) in the radial direction of the tool 3a. The main coolant L2 flows in the direction of the tip 22, approximately parallel to the central axis line CL.

The sub-coolant L1 is a portion with a smaller amount flowing at an inner position (i.e., a position close to the central axis line CL) in the radial direction of the tool 3a, and is guided by the inclined portion 30 to change the direction of flow.

The sub-coolant L1 of the coolant L gushing forward from the outlet 23 is guided by the inclined portion 30 to flow along the inclined portion 30. Because the main coolant L2 flowing outside the sub-coolant L1 flows outside the position of the inclined portion 30, the main coolant L2 flows approximately straightforwardly without being influenced by the inclined portion 30.

The sub-coolant L1 is guided by the inclined portion 30 to change the direction of flow to outward in the radial direction of the minor diameter portion 21, and collides with the main coolant L2. However, for the sub-coolant L1 with a smaller amount of flow (i.e., momentum and kinetic energy), the main coolant L2 with a larger amount of flow (i.e., momentum and kinetic energy) exists just like a wall.

As a result, the sub-coolant L1 collides with the main coolant L2 and is bounced back. The sub-coolant L1 then flows over the outer circumferential surface 26 of the minor diameter portion 21, spreading in a lateral direction like a curved fan without diffusing outward in the radial direction of the minor diameter portion 21 any more, and is supplied to the tip 22. Accordingly, a wide, curved and fan-like area of the sub-coolant L1 contacts with the outer circumferential surface 26 of the minor diameter portion 21 and with an outer circumferential surface of the tip 22, thereby cooling the minor diameter portion 21 and the tip 22.

On the other hand, the main coolant L2 ejected forward from the outlet 23 slightly changes the direction of flow by colliding with the sub-coolant L1. However, the amount of flow (momentum and kinetic energy) of the main coolant L2 is larger than the amount of flow (momentum and kinetic energy) of the sub-coolant L1.

Therefore, the main coolant L2 flows forward along the outer circumferential surface 26 of the minor diameter portion 21 and the outer circumferential surface of the tip 22 without significantly changing the direction of flow.

In an experiment with regard to the present invention, the shape, size and angle of inclination $\theta$ of the inclined portion 30 of the tool 3a were adjusted so that the amounts of flow of the sub-coolant L1 and the main coolant L2 were approximately the same. In this case, however, the sub-coolant L1 and the main coolant L2 mixed and turned into a turbulent flow in the midstream after the sub-coolant L1 collided with the main coolant L2. As a result, the sub-coolant L1 did not spread like a curved fan.

On the contrary, the shape, size and angle of inclination $\theta$ of the inclined portion 30 of the tool 3a, were adjusted so that the amount of flow of the main coolant L2 was larger than the amount of flow of the sub-coolant L1. In this manner, the sub-coolant L1 was bounced back after it collided with the main coolant L2, and a vortex flow was generated in the sub-coolant L1. It has been observed that the sub-coolant L1 flows further over the outer circumferential surface 26 of the minor diameter portion 21, spreading like a curved fan, and certainly reaches the tip 22.

The major diameter portion 20 of the tool 3a according to the present embodiment has three internal fluid passages 4 formed therein, which are uniformly spaced apart by 120 degrees about the central axis line CL. At the site of each outlet 23 of the fluid passage 4, the notch 25 is formed on the outer circumferential surface 26 of the minor diameter portion 21. Each notch 25 has an inclined surface (a planar inclined surface 37 in this embodiment) which composes the inclined portion 30 and which is provided at the front of the outlet 23.

Because three fluid passages 4 are uniformly formed in the tool 3a, the coolant L uniformly gushes forward from three outlets 23 on the outer circumferential surface of the minor diameter portion 21, respectively.

The sub-coolant L1 of each coolant L is then guided by the inclined portion 30 to change the direction of flow to outward in the radial direction of the minor diameter portion 21, and collides with the main coolant L2. The sub-coolant L1 is then bounced back by the main coolant L2 and flows over the outer circumferential surface 26 of the minor diameter portion 21, spreading like a curved fan, and reaches the tip 22.

As a result, the sub-coolant L1 is sufficiently supplied to the outer circumferential surface 26 and the tip 22. Accordingly, most of the entire outer circumferential surface 26 of the minor diameter portion 21 and approximately the entire circumference of the tip 22 are effectively cooled by the sub-coolant L1.

Because the coolant L is supplied to the entire outer circumferential surface of the tip 22, chips produced at the machining point can be effectively removed. Particularly, the three streams of the main coolant L2 respectively gushing from the three outlets 23 have a large amount of flow and are flowing approximately straight forward at high speed in a bundle-like manner, whereby a chip removal effect is effectively exerted.

The planar inclined surface 37 is formed so that the above-mentioned position P1 is exposed after the notch 25 has been cut out at a right angle direction against the central axis line CL up to the position P1 closest to the central axis line CL.

The inclined surface 37 is slanted by a predetermined angle $\theta$ (for example, $\theta=3$ through 10 degrees) against a surface S1 which is parallel to the central axis line CL. Accordingly, the entire outlet 23 is exposed at the notch 25.

The notch 25 is approximately triangular when seen from above, and approximately L-shaped when seen from the side. Because the notch 25 has a very simple shape, the notch 25 can be easily formed even if the tool 3a is made of a rigid material.

The inclined surface 37 is an isosceles triangle having a front vertex P2 with the outlet 23 opened at the center (position P1) of the base of the triangle. Therefore, the sub-coolant L1 of the coolant L gushing forward from the outlet 23 is guided by the inclined surface 37, changes the direction of flow to outward in the radial direction of the minor diameter portion 21, and collides with the main coolant L2 flowing outward.

The main coolant L2 then works as the wall against the flow of the sub-coolant L1, and bounces back the sub-coolant L1 and changes the direction of flow of the sub-coolant L1 so that it will not flow outward in the radial direction of the minor diameter portion 21 any more.

As a result, the sub-coolant L1 flows forward from vertex P2 of the inclined surface 37 and the edges of both sides of the triangle connected to the vertex P2, spreading three-dimensionally like a curved fan along the cylindrical circumferential side 26 of the minor diameter portion 21.

There may be a case in which the sub-coolant L1 spreads like a curved fan over the outer circumferential surface 26 of the minor diameter portion 21 so that a part of the main coolant L2 also spreads like a curved fan together with the sub-coolant L1 by changing the direction of flow of the sub-coolant L1. In this case, because the amount of flow of the coolant flowing over the outer circumferential surface 26 of the minor diameter portion 21 increases, the outer circumferential surface 26 of the minor diameter portion 21 and the tip 22 are cooled more effectively.

FIGS. 1B and 2 depict exemplary flows of the sub-coolant L1 and the main coolant L2 which gush from one of the three outlets 23. Here, flows of the sub-coolant L1 and the main coolant L2 gushing from the other two outlets 23 are identical to the flows from the illustrated one of the outlets 23.

When seen from behind the central axis line CL of the tool 3a, the inner circumference of the outlet 23 (i.e., a part of the cross section of the outlet 23 at the side of the central axis line CL) intersects the outer circumference 24 of the minor diameter portion 21 (FIG. 5). To achieve the intersection, the fluid passage 4 is provided close to the central axis line CL. In other words, the fluid passage 4 is provided so that the position P1 closest to the central axis line CL in the outlet 23 is closer to the central axis line CL than the position of the outer circumference 24 of the minor diameter portion 21. As a result, a part of the outlet 23 overlaps with the outer circumference 24 of the minor diameter portion 21, when seen from behind the central axis line CL.

Because the notch 25 is formed at the site of the outlet 23, the inclined portion 30 can be formed at the front of the outlet 23. The inclined portion 30 is formed obliquely so that the distance from the central axis line CL to the inclined portion 30 on further forward of the minor diameter portion 21 becomes larger than the distance from the central axis line CL to the inclined portion 30 on a closest position P1 on the entire circumference of the outlet 23 to the central axis line CL.

Therefore, the coolant L gushing forward from the outlet 23 is divided into the sub-coolant L1, of which direction of flow is changed by the inclined portion 30, and the main coolant L2 which flows outside the sub-coolant L1 and which is thus not influenced by the inclined portion 30.

Figure 6:
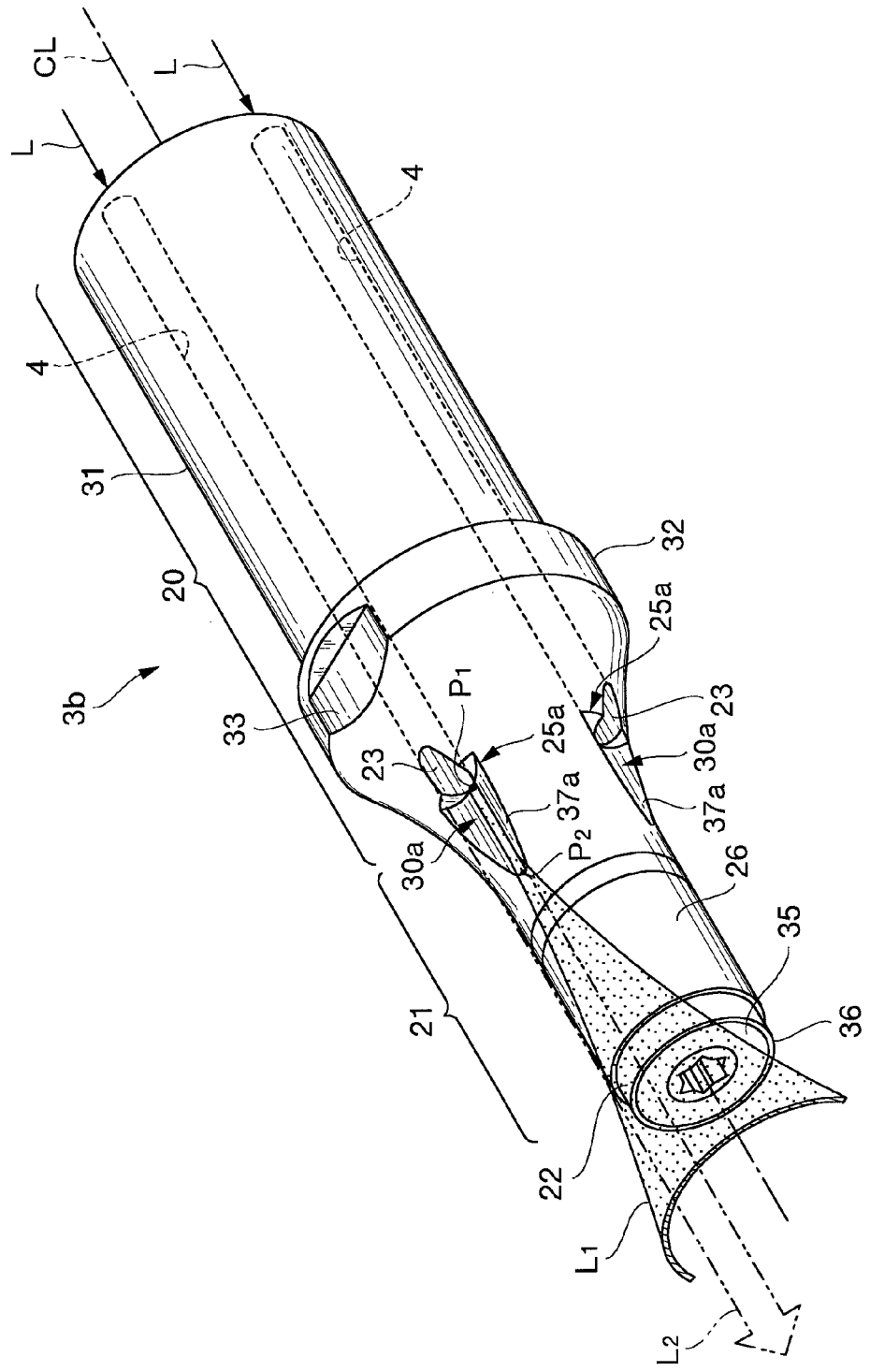

FIG. 6 is a perspective view, which is equivalent to FIG. 2, of the tool 3b according to an exemplary variation of the second embodiment.

The tool 3b shown in FIG. 6 has a cylindrical shape centered about the central axis line CL. The tool 3b comprises the major diameter portion 20 having formed therein at least one (three, in this case) fluid passage 4 for allowing the coolant L to flow, the minor diameter portion 21 provided in front of the major diameter portion 20, and the tip 22 attached to the front of the minor diameter portion 21. When seen from behind the central axis line CL, the inner circumference of the outlet 23 of the fluid passage 4 intersects with the outer circumference 24 of the minor diameter portion 21 (FIG. 5).

At the site of the outlet 23, the notch 25a is formed on the outer circumferential surface 26 of the minor diameter portion 21. The notch 25a has a groove-like inclined portion 30a provided at the front of the outlet 23.

The inclined portion 30a is formed obliquely so that the distance from the central axis line CL to the inclined portion 30a on further forward of the minor diameter portion 21 becomes larger than the distance from the central axis line CL to the inclined portion 30a on the closest position P1 on the entire circumference of the outlet 23 to the central axis line CL. The inclined portion 30a guides a partial flow (flow of the sub-coolant L1) of the coolant L, gushing forward from the outlet 23, outward in the radial direction of the minor diameter portion 21.

The coolant L ejected forward from the outlet 23 of the fluid passage 4 is divided by the inclined portion 30a into the main coolant L2 and the sub-coolant L1. The main coolant L2 is a portion with a larger amount flowing at an outer position in the radial direction of the tool 3b. The sub-coolant L1 is a portion guided by the inclined portion 30a with a smaller amount flowing at an inner position in the radial direction of the tool 3b.

The main coolant L2 flows it the direction of the tip 22, approximately parallel to the central axis line CL. The sub-coolant L1 is guided by the inclined portion 30a to change the direction of flow to outward in the radial direction of the minor diameter portion 21, and collides with the main coolant L2.

The sub-coolant L1 is then bounced backed by the main coolant L2 working as a wall. The sub-coolant L1 bounced back flows over the outer circumferential surface 26 of the minor diameter portion 21, spreading like a curved fan without diffusing outward in the radial direction of the minor diameter portion 21, and is supplied to the tip 22. Therefore, the same operative effect as the above embodiment is exerted.

The major diameter portion 20 has the three fluid passages 4 formed therein, which are uniformly located in the circumferential direction centered about the central axis line CL. At the site of each outlet 23 of the fluid passage 4, the notch 25a is formed on the outer circumferential surface 26 of the minor diameter portion 21. The notch 25a has an inclined surface 37a which composes the inclined portion 30a and is provided at the front of the outlet 23. The inclined surface 37a is formed in a groove-like shape having a U-shaped cross section.

The sub-coolant L1 ejected from the outlet 23 is guided in a manner enveloped by the groove-like inclined surface 37a. Therefore, the sub-coolant L1 changes the direction of almost all the amount of flow and collides with the main coolant L2, without diffusing to the periphery.

The sub-coolant L1 bounced back by the main coolant L2 flows over the outer circumferential surface 26 of the minor diameter portion 21, spreading like a curved fan without diffusing outward in the radial direction and is supplied to the tip 22. Accordingly, the outer circumferential surface 26 of the minor diameter portion 21 and the tip 22 are effectively cooled.

FIG. 6 (and FIG. 7) depicts the flows of the sub-coolant L1 and the main coolant L2 gushing from one of the three outlets 23. Note that flows of the sub-coolant L1 and the main coolant L2 gushing from the other two outlets 23 are identical to the flows from one of the outlets 23 shown in FIG. 6 (and FIG. 7).

As another exemplary variation, an inclined portion may be provided by adding a cover (not shown) or the like to the site of the each outlet 23 in the tools 3a and 3b.

As still another exemplary variation, another internal fluid passage may be formed, besides the three fluid passages 4, at the center of the tools 3a and 3b in the direction of the central axis line CL in the tools 3a and 3b to supply the coolant L to this center-through, internal fluid passage. In this manner, both the outer circumferential surface and the interior of the tools 3a and 3b are cooled by the coolant L. As a result, the outer circumferential surface of the tool and the tip can be cooled more effectively.

The operation of machining the workpiece 7 using the tool 3a or 3b will be described next, referring to FIGS. 1B to 6.

First, the tool 3a or 3b is attached to the tool holder 5, and the holder 5 is mounted on the main spindle 2. The main spindle 2 is rotationally driven to rotate the tool 3a or 3b together with the holder 5. The workpiece 7a driven by the headstock 8 and supported by the chuck 9 and the center 10 is rotating.

The device for supplying the coolant L has been preliminarily set to an operating state and supplies the coolant L to the fluid passage 4 of the tool 3a or 3b via the main spindle 2 and the holder 5. In this state, the main spindle 2 is moved in the directions of the two perpendicular axes (Y and Z axes) relatively to the workpiece 7a. The rotating workpiece 7a is then machined by the rotating tool 3a or 3b.

While machining, the coolant L flows through each of the three fluid passages 4 formed in the major diameter portion 20 and gushes from each outlet 23. The coolant L ejected forward from the outlet 23 is divided into the main coolant L2 and the sub-coolant L1 due to existence of the inclined portion 30, 30a of the notch 25, 25a.

Because the main coolant L2 with a larger amount of flow at an outer position in the radial direction of the tool 3a or 3b is not affected by the inclined portion 30, 30a, the main coolant L2 flows in the direction of the tip 22 approximately parallel with the central axis line CL.

On the contrary, the sub-coolant L1 with a smaller amount of flow at an inner position in the radial direction of the tool 3a or 3b is guided by the inclined portion 30, 30a to change the direction of flow to outward in the radial direction of the minor diameter portion 21. In other words, the inclined portion 30, 30a, working similarly to a jump platform, ejects the sub-coolant L1 outward from the minor diameter portion 21.

The sub-coolant L1 ejected outward collides with the main coolant L2 flowing immediately outside thereof with a larger amount of flow. However, because the main coolant L2 has a larger amount of flow than the sub-coolant L1, the momentum and kinetic energy of the main coolant L2 are also larger. As a result, the main coolant L2, working as a wall blocking the flow of the sub-coolant L1, bounces back the sub-coolant L1.

The sub-coolant L1 collided with and bounced back by the main coolant L2 spreads along the outer circumferential surface 26 of the minor diameter portion 21 like a curved fan without diffusing outward in the radial direction of the minor diameter portion 21 any more.

As thus described, the sub-coolant L1 flows over the outer circumferential surface 26 of the minor diameter portion 21, spreading like a curved fan, and is supplied to the tip 22. The main coolant L2 discharged from the outlet 23 also flows over the outer circumferential surface 26 of the minor diameter portion 21, and is supplied to the tip 22.

As a result, the outer circumferential surface 26 of the minor diameter portion 21 and the tip 22 are cooled by the sub-coolant L1 and the main coolant L2.

Because three outlets 23 are formed on the tools 3a and 3b, respectively, and the coolant L gushes from each outlet 23, three streams of the sub-coolant L1 are uniformly and sufficiently supplied on the outer circumferential surface 26 of the minor diameter portion 21 and the tip 22. Therefore, the entire outer circumferential surface 26 of the minor diameter portion 21 and the entire outer circumferential surface of the tip 22 are effectively and uniformly cooled.

As thus described, the machine tool 1a machines the rotating workpiece 7a while rotating the tool 3a or 3b, the machining speed increases, and productivity largely is improved compared with conventional lathes. Additionally, because the tools 3a and 3b rotate, the cutting edge 36 of the tip 22 is always cooled in comparison to the tool which does not rotate. As a result, life of the tools 3a and 3b is significantly extended.

Owing to the rotating tools 3a and 3b, the machine tool 1a can machine the workpiece 7a which are difficult to turn such as nickel alloys or heat-resistant alloys, and is also capable of high-precision machining suppressing vibration while machining. Complicated machining such as oval machining is made possible by performing a control to synchronize the main spindle 2 and headstock 8, increasing the types of machining thereby.

Using the tools 3a and 3b in the machine tool 1a, a force is applied the tools 3a and 3b in the shank direction, in comparison with conventional turning tools to which lateral force is applied. As a result, rigidity of the tools 3a, 3b is strengthened much more than conventional turning tools, allowing stronger cutting.

As thus described, employing the tools 3a and 3b in the machine tool 1a, it is possible to break through the inherent limit with conventional turning tools which is one-point turning.

Note that the machine tool 1a is capable of turning the rotating workpiece 7a with a tool, by supporting the tool in a non-rotating state with the main spindle 2.

Third Embodiment

Figure 7:
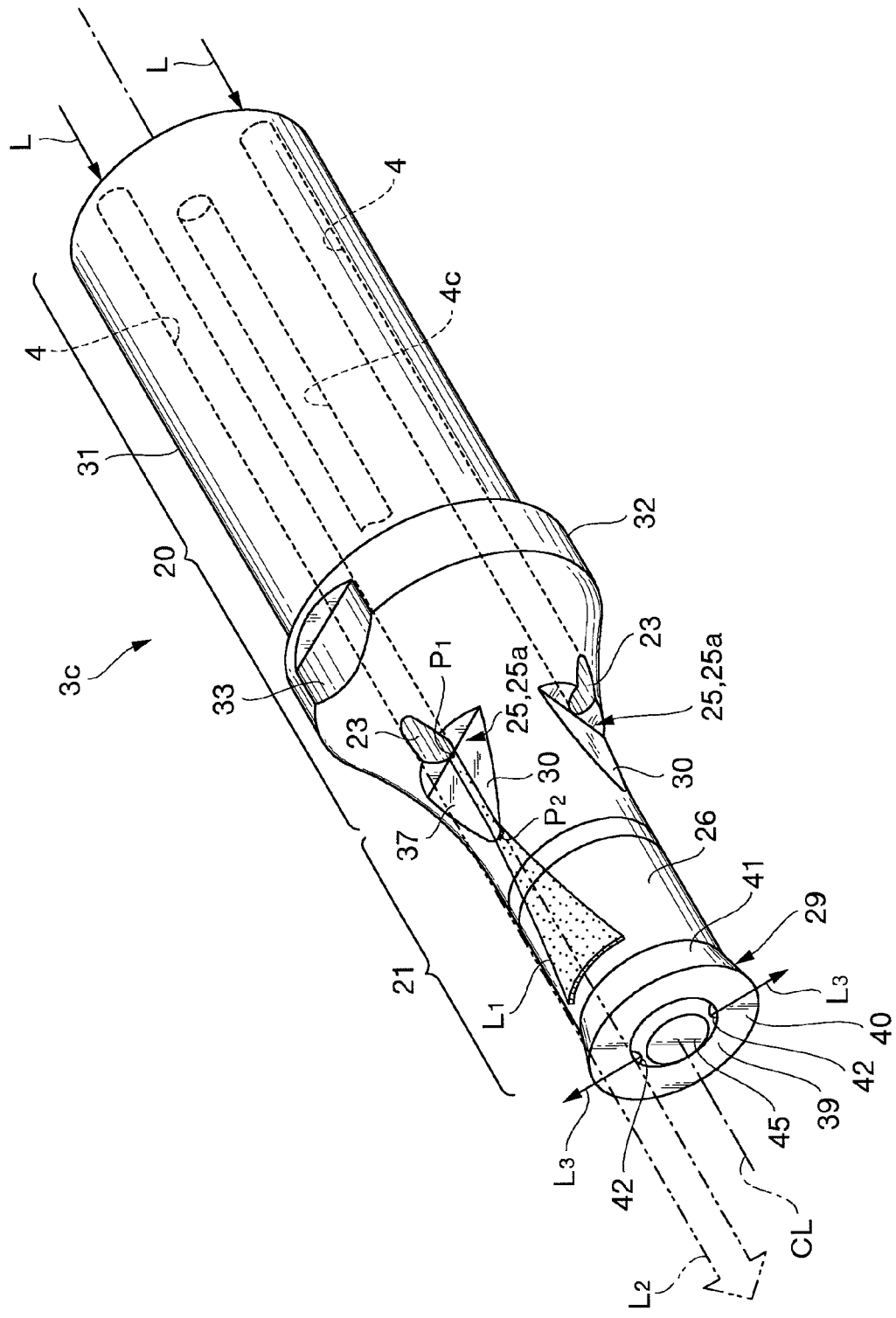
FIGS. 7 to 9 depict a third example of the present invention.
Figure 8:
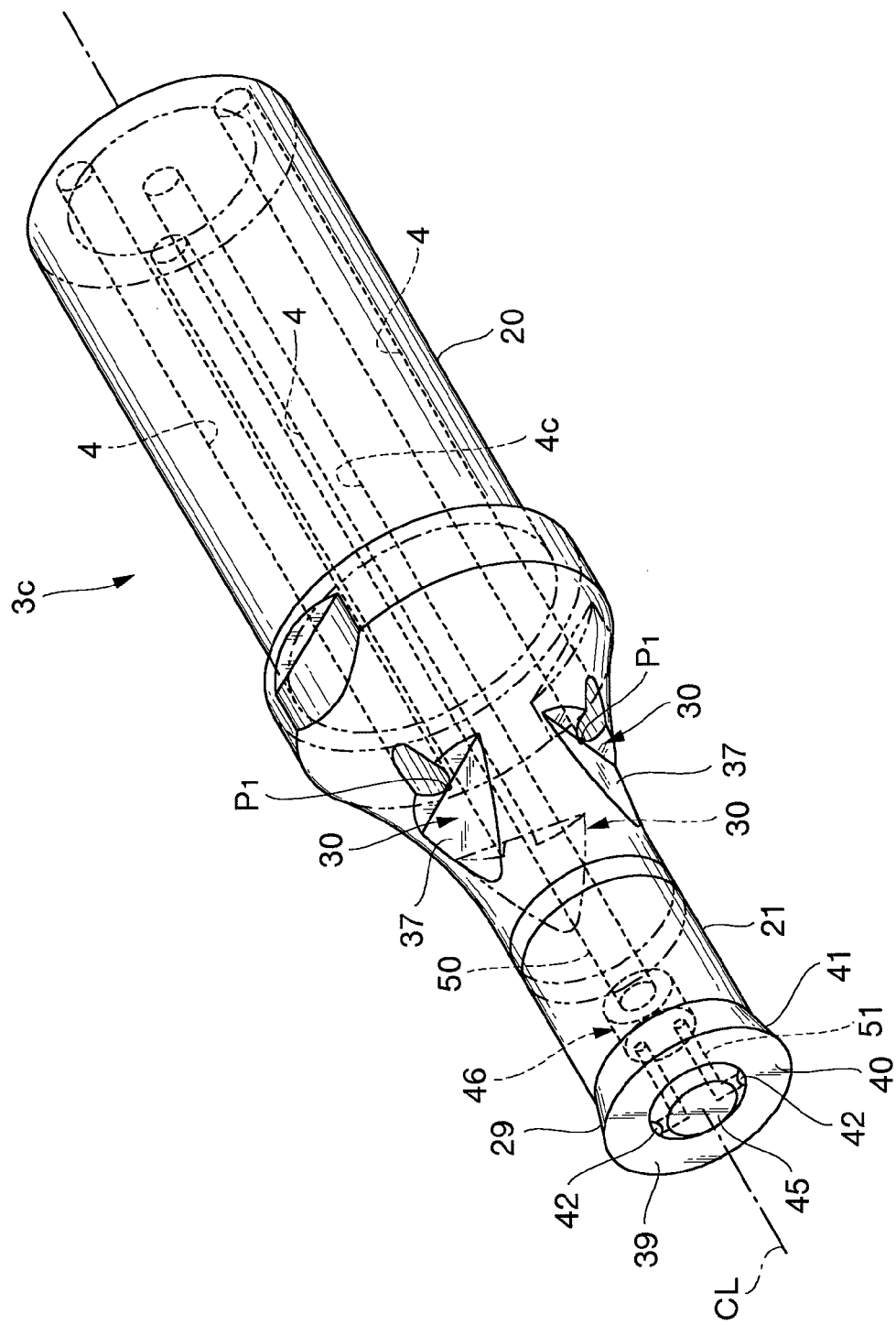
Figure 9:
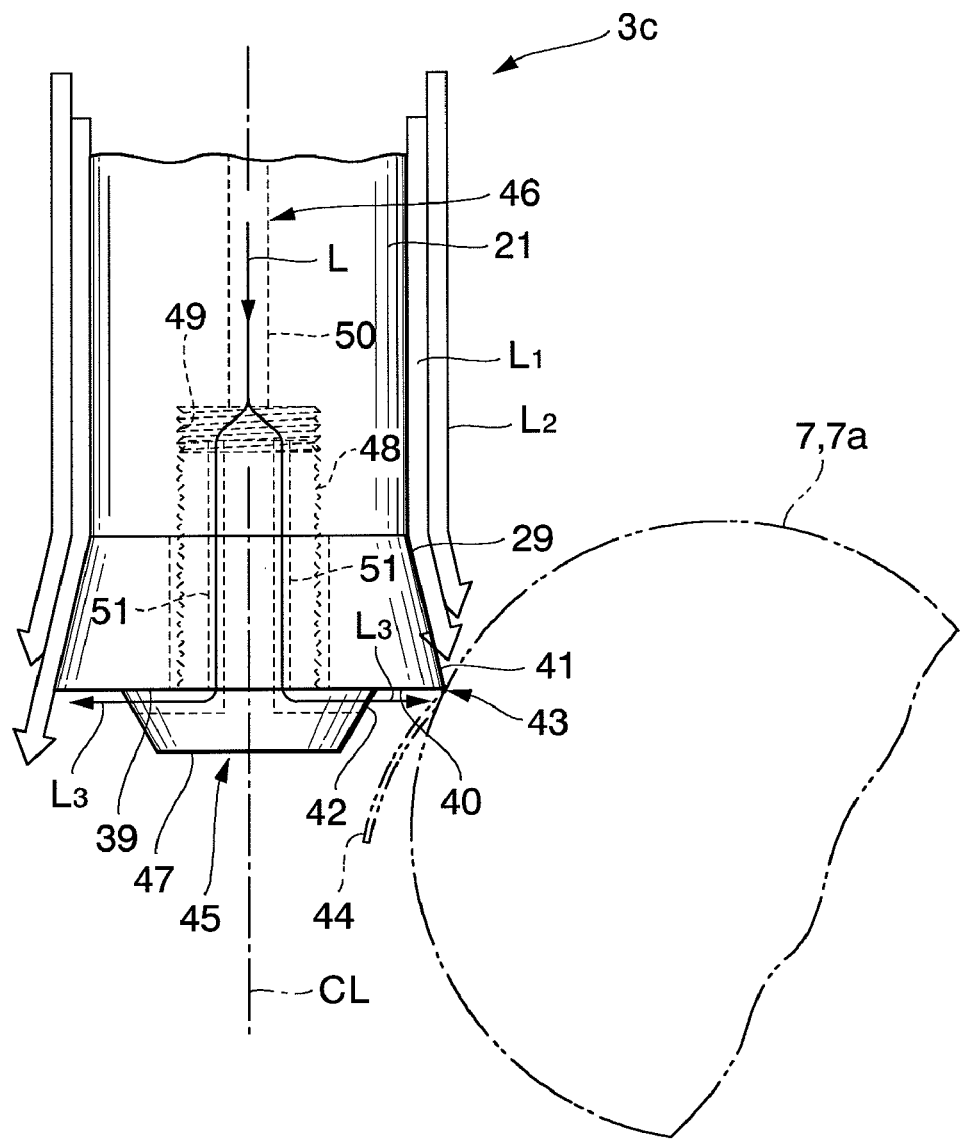

FIGS. 7 to 11 depict a third embodiment of the present invention. FIG. 7 is a perspective view of the cylindrical rotating tool 3c, which is equivalent to FIG. 2. FIG. 8 is a transparent perspective view of the tool 3c, which is equivalent to FIG. 3. FIG. 9 is an enlarged view showing the workpiece 7, 7a being machined by the tool 3c.

In the tool 3c, identical reference numerals are assigned to identical or corresponding parts of the tools 3, 3a and 3b, with the description thereof omitted.

The tool 3c is a rotating tool having a cylindrical shape centered about the central axis line CL. The tool 3c can be rotated to machine the non-rotating workpiece 7 (FIG. 1A), and additionally, to machine the rotating workpiece 7a (FIG. 1B).

The tool 3c comprises the major diameter portion 20 having formed therein at least one internal fluid passage (internal fluid passage) 4, 4c for allowing the coolant L to flow, the minor diameter portion 21 provided in front of the major diameter portion 20, and a tip 29 attached to the front of the minor diameter portion 21.

The tip 29 is an insert. The tip 29 has a face 40, located at the front end 39, and a flank 41 located on the outer circumference. The major diameter portion 20 has three internal fluid passages 4 formed therein, which are uniformly located in the circumferential direction, and a single internal fluid passage 4c formed at the center concentrically with the central axis line CL.

When seen from behind the central axis line CL of the tool 3c, the inner circumference of the each outlet 23 of the three fluid passages 4, uniformly provided in the circumferential direction, intersects with the outer circumference 24 of the minor diameter portion 21 (FIG. 5). At the site of the outlet 23, the notch 25 (or the notch 25a shown in FIG. 6) is formed on the outer circumferential surface of the minor diameter portion 21.

The notch 25 has the inclined portion 30 (or the inclined portion 30a shown in FIG. 6) provided at the front of the outlet 23.

The inclined portion 30 is formed obliquely so that the distance from the central axis line CL to the inclined portion 30 on further forward of the minor diameter portion 21 becomes larger than the distance from the central axis line CL to the inclined portion 30 on the closest position P1 on the entire circumference of the outlet 23 to the central axis line CL. The inclined portion 30 guides a partial flow (flow of the sub-coolant L1) of the coolant L, gushing forward from the outlet 23, outward in the radial direction of the minor diameter portion 21.

The coolant L gushing forward from the outlet 23 of the fluid passage 4 is divided by the inclined portion 30 into the main coolant L2 and the sub-coolant L1.

The main coolant L2 is a portion with a larger amount flowing at an outer position in the radial direction of the tool 3c (i.e., a position far from the central axis line CL). The main coolant L2 flows in the direction of tip 29, approximately parallel to the central axis line CL. The sub-coolant L1 is a portion with a smaller amount flowing at an inner position in the radial direction of the tool 3c (i.e., a position close to the central axis line CL), and is guided by the inclined portion 30 to change the direction of flow.

The sub-coolant L1 of the coolant L, gushing forward from the outlet 23, is guided by the inclined portion 30 to flow along the inclined surface 37 (or the inclined surface 37a shown in FIG. 6) of the inclined portion 30.

Because the main coolant L2 flowing outside the sub-coolant L1 flows outside the position of the inclined portion 30, the main coolant L2 flows approximately straightforwardly without being influenced by the inclined portion 30.

The sub-coolant L1 is guided by the inclined portion 30 to change the direction of flow to outward in the radial direction of the minor diameter portion 21, and collides with the main coolant L2. As a result, the sub-coolant L1 is bounced backed by the main coolant L2. The sub-coolant L1 then flows over the outer circumferential surface of the minor diameter portion 21, spreading in a lateral direction like a curved fan without diffusing outward in the radial direction of the minor diameter portion 21 any more, and is supplied to the tip 29.

Accordingly, a wide, curved and fan-like area of the sub-coolant L1 contacts with the outer circumferential surface of the minor diameter portion 21 and the tip 29, thereby cooling the minor diameter portion 21 and the tip 29.

The major diameter portion 20 of the tool 3c has three internal fluid passages 4 formed therein, which are uniformly spaced apart by 120 degrees about the central axis line CL. At the site of each outlet 23 of the fluid passage 4, the notch 25 (or notch 25a) is formed on the outer circumferential surface 26 of the minor diameter portion 21.

Each notch 25 has an inclined surface 37 which composes the inclined portion 30 and which is provided at the front of the outlet 23. The inclined surface 37 of the inclined portion 30 is formed in a planar shape. In the notch 25a shown in FIG. 6, the inclined surface 37a which composes the inclined portion 30a is formed in a groove-like shape.

In the tool 3c, the sub-coolant L1 gushing forward from the outlet 23 of the fluid passage 4 flows over the outer circumferential surface of the tool 3c, spreading like a curved fan without diffusing outward in the radial direction, and is supplied to the tip 29.

In addition, the main coolant L2 gushing forward from the outlet 23 flows approximately straightforwardly without being influenced by the inclined portion 30, and is supplied to the tip 29. Accordingly, the outer circumferential surface 26 of the tool 3c and the flank 41 of the tip 29 are effectively cooled.

The tip 29 having the face 40 has at least one (two, in this embodiments) face outlet 42. The face outlet 42 is formed at the front end 39 of the tip 29, in communication with the internal fluid passage 4c at the center of the major diameter portion 20, and is opened outward in the radial direction of the tip 29.

A face coolant L3 ejected outward in the radial direction of the tip 29 at the face outlet 42 is supplied to at least a machining point 43 on the face 40. At the machining point 43, the chips 44 are produced while machining.

The tip 29 has a fastener 45. The fastener 45 is provided at the center of the front end 39 of the tip 29 to fasten the tip 29 to the minor diameter portion 21. The fastener 45 has a plurality (two, in this embodiment) of face outlets 42 which are uniformly formed in the circumferential direction about the central axis line CL and which are opened outward in the radial direction of the tip 29.

The fastener 45 has a head 47 press-contacting the front end 39 of the tip 29 and a screw 48. The screw 48, which is formed integrally and projectingly from the head 47, is screwed into a female screw 49 of the minor diameter portion 21 to removably fasten the tip 29 to the minor diameter portion 21.

An internal sub-fluid passage 46 is formed inside each of the minor diameter portion 21 and the fastener 45. The sub-fluid passage 46 is a fluid passage for allowing the face coolant L3 to flow from the fluid passage 4c at the center of the major diameter portion 20 to the face outlet 42 of the tip 29.

The sub-fluid passage 46 has a first fluid passage 50 formed in the minor diameter portion 21 and at least one (two, in this embodiment) second fluid passage 51 formed in the fastener 45.

The first fluid passage 50, formed concentrically with the central axis line CL of the minor diameter portion 21 at the center, is in communication with the fluid passage 4c at the center of the major diameter portion 20. The second fluid passage 51 is formed in the fastener 45 in an L-shaped manner. The second fluid passage 51 is in communication with the first fluid passage 50 of the minor diameter portion at the upstream, and is in communication with the face outlet 42 at the downstream. The two second fluid passages 51 are uniformly spaced apart by 180 degrees about the central axis line CL of the fastener 45.

Figure 10:
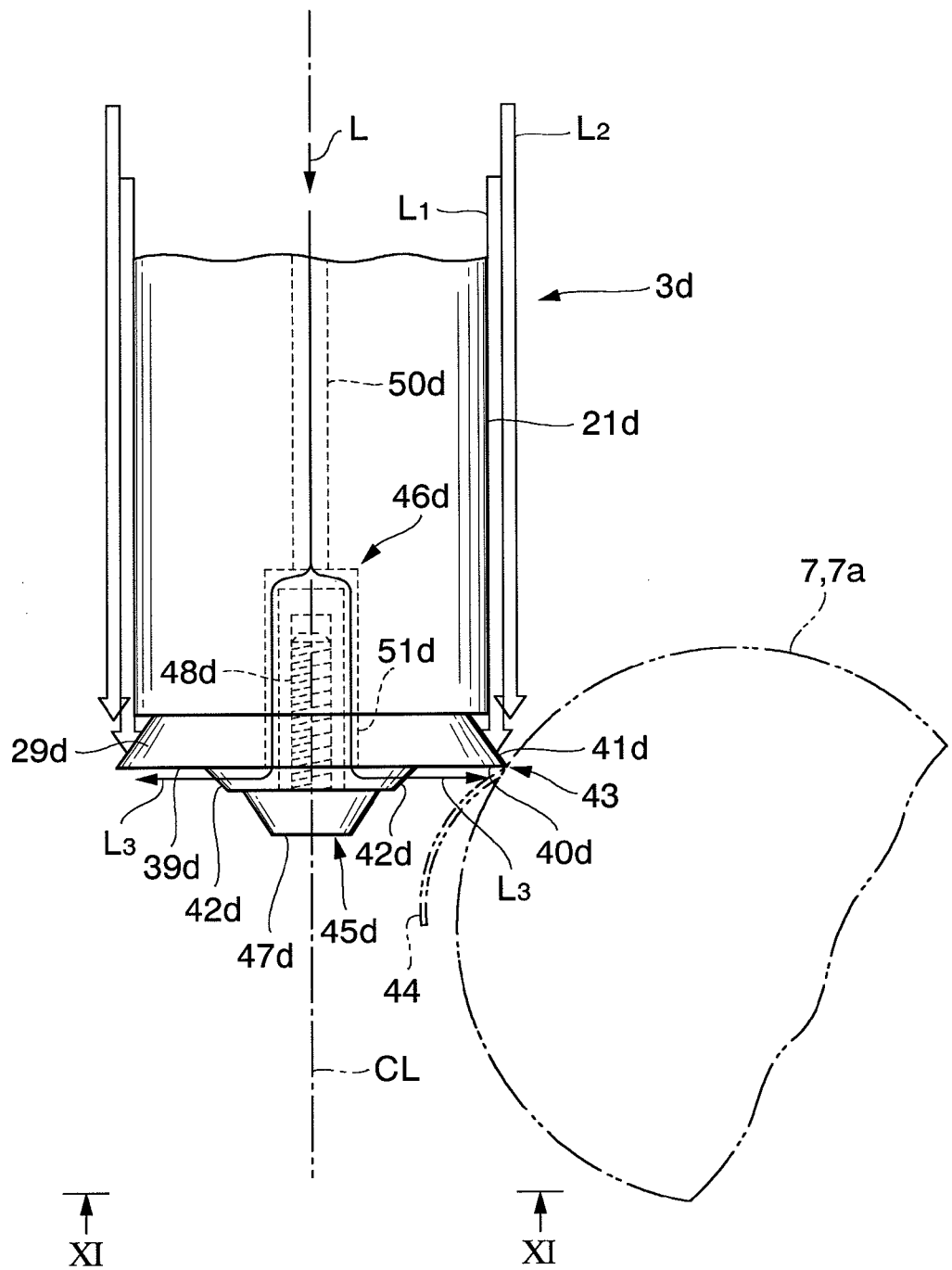
FIG. 10 is an enlarged view showing workpiece being machined by a cylindrical rotating tool according to a variation of the third exemplary embodiment.
Figure 11:
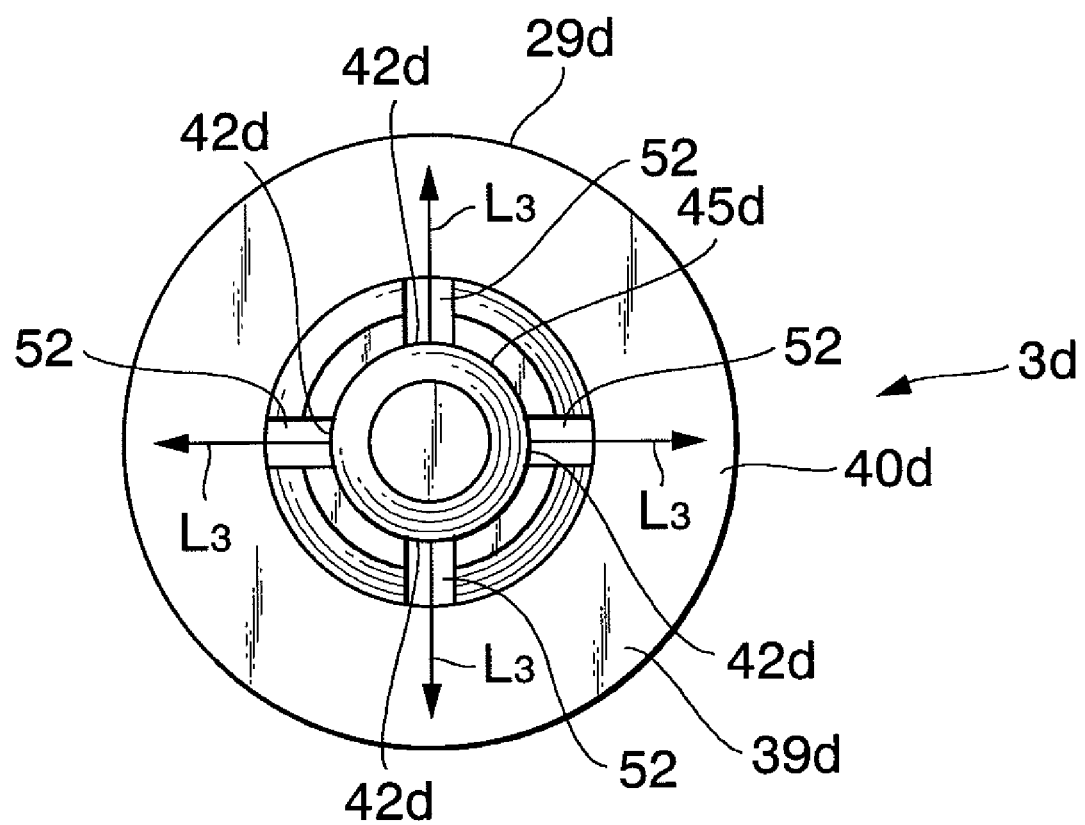
FIG. 11 is a view on arrow along line XI-XI of FIG. 10.

FIG. 10 is an enlarged view showing the workpiece 7, 7a being machined by a cylindrical rotating tool 3d according to a variation of the third exemplary embodiment, and FIG. 11 is a view on arrow along line XI-XI of FIG. 10.

The tool 3d shown in FIGS. 10 and 11 is rotating tool doing having a cylindrical shape centered about the central axis line CL. The tool 3d is identical to the tool 3c of the third example except for arrangement of the internal fluid passage of a minor diameter portion 21d and the tip 29d.

The tool 3d comprises the major diameter portion 20 (FIGS. 7 and 8) having the fluid passages 4 and 4c formed therein, a minor diameter portion 21d provided in front of the major diameter portion 20, and a tip 29d attached to the front of the minor diameter portion 21d.

The tip 29d, which is an insert, has a face 40d located at a front end 39d, and a flank 41d located on the outer circumference. In the tool 3d, the tip 29d itself has at least one face outlet 42d formed therein. The tip 29d is fastened to the minor diameter portion 21d with a fastener (a simple bolt, for example) 45d.

When seen from behind the central axis line CL of the tool 3d, the inner circumference of the each outlet 23 of the three fluid passages 4, uniformly provided in the circumferential direction, intersects with the outer circumference 24 of the minor diameter portion 21d (FIG. 5). At the site of the outlet 23, the notch 25 (or the notch 25a shown in FIG. 6) is formed on the outer circumferential surface of the minor diameter portion 21d.

The notch 25 has the inclined portion 30 (or the inclined portion 30a shown in FIG. 6) provided at the front of the outlet 23. The inclined portion 30 is formed obliquely so that the distance from the central axis line CL to the inclined portion 30 on further forward of the minor diameter portion 21d becomes larger than the distance from the central axis line CL to the inclined portion 30 on the closest position P1 on the entire circumference of the outlet 23 to the central axis line CL. The inclined portion 30 guides a partial flow (flow of the sub-coolant L1) of the coolant L, gushing forward from the outlet 23, outward in the radial direction of the minor diameter portion 21d.

The coolant L gushing forward from the outlet 23 of the fluid passage 4 is divided by the inclined portion 30 into the main coolant L2 and the sub-coolant L1. The operation and effect of the main coolant L2 and the sub-coolant L1 are identical to the third embodiment. As a result, the outer circumferential surface of the tool 3d and the flank 41d of the tip 29d are effectively cooled.

The tip 29d having the face 40d has at least one (four, in this embodiment) face outlet 42d. The face outlet 42d is formed at the front end 39d of the tip 29d, and is in communication with the fluid passage 4c at the center of the major diameter portion 20, and is opened outward in the radial direction of the tip 29d.

The face coolant L3 ejected outward in the radial direction of the tip 29d at the outlet 42d is supplied to at least the machining point 43 on the face 40d. At the machining point 43, the chips 44 are produced while machining.

The tip 29d has a fastener 45d. The fastener 45d is provided at the center of the front end 39d of the tip 29d to fasten the tip 29d to the minor diameter portion 21d.

The tip 29d has a plurality (four, in this embodiment) of outlets 42d, which are uniformly formed in the circumferential direction about the central axis line CL and are opened outward in the radial direction of the tip 29d, and a plurality (four, in this embodiment) of grooves 52 which are radially formed in communication with the outlets 42d. The grooves 52 of the tip 29d are grooves for guiding the face coolant L3 ejected from the outlets 42d to the face 40d.

The fastener 45d, having a head 47d press-contacting the tip 29d and a screw 48d integrated therewith, removably fastens the tip 29d to the minor diameter portion 21d.

An internal sub-fluid passage 46d is formed inside each of the minor diameter portion 21d and the tip 29d. The sub-fluid passage 46d is an internal fluid passage for allowing the face coolant L3 to flow from the fluid passage 4c at the center of the major diameter portion 20 to the outlet 42d of the tip 29d. The sub-fluid passage 46d has a first internal fluid passage 50d formed in the minor diameter portion 21d and a second internal fluid passage 51d formed in the tip 29d.

The first fluid passage 50d, formed concentrically with the central axis line CL of the minor diameter portion 21d at the center, is in communication with the fluid passage 4c at the center of the major diameter portion 20. The second fluid passage 51d, formed in the tip 29d, is in communication with the first fluid passage 50d of the minor diameter portion at the upstream, and is in communication with the outlet 42d at the downstream.

The operation of machining the workpiece 7, 7a using the tool 3c or 3d will be described next.

The main spindle 2 is rotationally driven to rotate the tool 3c or 3d together with the tool holder 5. The coolant L is supplied to the fluid passages 4 and 4c of the tool 3c or 3d via the main spindle 2 and the holder 5.

The workpiece 7, 7a is machined by the rotating tool 3c or 3d. While machining, the coolant L flows through each of the three fluid passages 4 formed on the major diameter portion 20 and gushes forward from each outlet 23. As a result, the outer circumferential surface 26 of the minor diameter portion 21 or 21d and the flank 41 or 41d of the tip 29 or 29d are cooled by the main coolant L2 and the sub-coolant L1.

While machining on the tool 3c, the coolant L flows forward through the fluid passage 4c at the center of the major diameter portion 20 and the first fluid passage 50 of the minor diameter portion 21. Subsequently, after having been divided to the two second fluid passages 51 of the fastener 45, the coolant L turns approximately at a right angle and gushes outward in the radial direction of the tip 29 at the two face outlets 42.

The face coolant L3 ejected from each of the two outlets 42 is supplied to the machining point 43 on the face 40, and collides with the boundary between the chips 44 produced at the machining point 43 and the face 40.

Because the tool 3c is rotating, its centrifugal force causes the face coolant L3 to collide hard with the boundary. Thereby the face coolant L3 is supplied twice to the machining point 43 while the tool 3c makes one rotation. As a result, the face 40 on which the chips 44 contact with the tip 29 is lubricated and cooled.

On the other hand, the coolant L flows forward through the fluid passage 4c at the center of the major diameter portion 20 and the first fluid passage 50d of the minor diameter portion 21d in the tool 3d while machining. Subsequently, after the coolant L has flown forward through the second fluid passage 51d of the tip 29d, and has collided with the head 47d of the fastener 45d, and has turned approximately at a right angle, the coolant L gushes outward in the radial direction of the tip 29d through the grooves 52 from the four outlets 42d.

The face coolant L3, thus ejected from each of the four outlets 42d, flows through the groove 52, and is supplied to the machining point 43 on the face 40d, and collides with the boundary between the chips 44 produced at the machining point 43 and the face 40d.

Because the tool 3d is rotating, its centrifugal force causes the coolant L3 to collide hard with the boundary. Thereby the face coolant L3 is supplied to the machining point 43 four times while the tool 3d makes one rotation. As a result, the face 40d on which the chips 44 contact with the tip 29d is lubricated and cooled.

As thus described, both the flank 41, 41d of the outer circumference of the tip 29, 29d and the machining point 43 of the face 40, 40d are simultaneously cooled by the coolant L1, L2, L3 in the tool 3c, 3d. In addition, the defects such that weld deposit of the chips 44 gradually sticking to the face 40, 40d can be prevented.

Therefore, because both of the circumferential surface of the tip 29, 29d, and the face 40, 40d are simultaneously are cooled using the tool 3c, 3d, highly-efficient machining and extended life of the tip 29, 29d can be realized. Additionally, productivity of a workpiece which is difficult to machine (difficult-to-machine material) or a heat-resistant alloy can be improved by improving the machining condition. The tool 3c, 3d also exerts the same operation and effect as with the previously mentioned examples.

First to Third Embodiments

In the machine tool 1 (machining center) shown in FIG. 1A and the machine tool 1a (multi-axis turning center) shown in FIG. 1B, the tool 3, 3a to 3d rotate. Therefore, focusing attention on one point of the cutting edge 36 of the tip 22 (one point of the cutting edge of the tips 28, 29 and 29d), the heat generated by cutting the workpiece 7, 7a by one point of the cutting edges of the machining point causes the temperature to rise high (e.g., 500 to 800 degrees).

Although the one point of the cutting edge returns to the machining point again after leaving the machining point and rotating once, it is cooled naturally because there is no heat generation meanwhile. In addition, the entire outer circumferential surface 26 of the minor diameter portion 21, 21d, and the entire tip 22, 28, 29, 29d of the tool 3, 3a to 3d are effectively and uniformly cooled by the coolant L. As a result, because the one point of the cutting edge of the tip 22, 28, 29, 29d has been sufficiently cooled when it returns to the machining point again, it can desirably machine the workpiece 7, 7a at the machining point.

As thus described, because the present invention can prevent the temperature of one point of the cutting edge of the tool 3, 3a to 3d from rising too high, abrasion of the tool 3, 3a to 3d can be reduced to extend the life of the tools. If, on the contrary, the tool 3, 3a to 3d is used with a conventional level of life, the productivity can be further improved by raising the machining condition.

In the embodiments and exemplary variations thereof shown in FIGS. 1A to 11, the circumferential surface and the tip 22, 28, 29, 29d of the tool 3, 3a to 3d can be effectively cooled. Therefore, the amount of the coolant L supplied to the tool 3, 3a to 3d can be reduced. As a result, the device for supplying the coolant L can be downsized, whereby environmental burden due to the coolant L can be reduced.

In the tool 3, 3a to 3d having the fluid passage 4, only the notch 25, 25a are formed at the position of the outlet 23 of the fluid passage 4. Therefore, machining process on the tool 3, 3a to 3d is very easy compared with a case in which some parts are otherwise added to the rotating tool, and the finished structure is also simple. In addition, because the tool 3, 3a to 3d inherently have a simple cylindrical appearance, the process of forming the notch 25, 25a thereto is easy.

Because the tool 3, 3a to 3d machines the workpiece while rotating, the temperature of the minor diameter portion 21, 21d and the tip 22, 28, 29, 29d generally rises. However, according to the present invention, the coolant L is supplied to be uniformly distributed over the entire minor diameter portion 21, 21d, and the tip 22, 28, 29, 29d, regardless of the rotational speeds of the tool 3, 3a to 3d. Therefore, the entire minor diameter portion 21, 21d, and the tip 22, 28, 29, 29d are effectively and uniformly cooled.

The cylindrical rotating tool having the internal fluid passage according to the present invention can be applied to a rotating tool used in a machine tool such as a multi-axis turning center, a lathe and a turning center, other than a tool used in a machining center.

Although embodiments (including exemplary variations, similarly hereinafter) of the present invention have been describe above, the present invention is not limited to the above embodiments and various types of variations, additions, or the like are possible within the scope of the subject matter of the present invention.

Identical reference numerals in the drawings indicate identical or corresponding parts.

What is claimed is:

1. A cylindrical rotating tool with internal fluid passage, said tool comprising a major diameter portion having at least one internal fluid passage for allowing coolant to flow, a minor diameter portion provided in front of the major diameter portion, and a tip attached to the front of the minor diameter portion, said tool having a cylindrical shape centered about a central axis line,
    wherein when seen from behind the central axis line, an inner circumference of an outlet of said internal fluid passage intersects with an outer circumference of said minor diameter portion,
    at the site of said outlet, a notch is formed on an outer circumferential surface of said minor diameter portion,
    said notch has an inclined portion provided at the front of said outlet,
    said inclined portion is formed obliquely so that the distance from said central axis line to said inclined portion on further forward of said minor diameter portion becomes larger than the distance from said central axis line to said inclined portion on a closest position on the entire circumference of said outlet to said central axis line, and
    said inclined portion guides a partial flow of said coolant, gushing forward from said outlet, outward in a radial direction of said minor diameter portion.

2. The cylindrical rotating tool according to claim 1,
    wherein said coolant gushing forward from said outlet of said internal fluid passage is divided into main coolant with a larger amount flowing at an outer position in the radial direction of said tool, and sub-coolant with a smaller amount flowing at an inner position in the radial direction of said tool to be guided by said inclined portion,
    said main coolant flows in the direction of said tip approximately parallel to said central axis line, and
    said sub-coolant is guided by said inclined portion to change the direction of flow to outward in the radial direction of said minor diameter portion, and collides with said main coolant so that said sub-coolant is bounced back by said main coolant and flows over said outer circumferential surface of said minor diameter portion, spreading like a curved fan without diffusing outward in the radial direction of said minor diameter portion, and is supplied to said tip.

3. The cylindrical rotating tool according to claim 1,
    wherein said major diameter portion has three of said internal fluid passages, which are formed therein and are uniformly located in the circumferential direction centered about said central axis line,
    at the site of each of said outlet of said internal fluid passage, said notch is formed on said outer circumferential surface of said minor diameter portion, and
    said notch has an inclined surface which composes said inclined portion and which is provided at the front of said outlet.

4. The cylindrical rotating tool according to claim 3, wherein said inclined surface composing said inclined portion is formed in a planar or a groove-like shape.

5. The cylindrical rotating tool according to claim 1, wherein a rotating workpiece is machined using said tool.

6. The cylindrical rotating tool according to claim 1,
    wherein said tip having a face has at least one face outlet, which is formed at a front end of the tip and is in communication with said internal fluid passage and is opened outward in the radial direction of said tip, and
    a face coolant ejected outward in the radial direction of said tip at the face outlet is supplied to at least a machining point on said face.

7. The cylindrical rotating tool according to claim 6,
    wherein said tip has a fastener provided at the center of the front end of the tip in order to fasten the tip to said minor diameter portion,
    the fastener has a plurality of said face outlets which are uniformly formed in the circumferential direction about the central axis, and
    an internal sub-fluid passage is formed inside each of said minor diameter portion and said fastener for allowing said face coolant to flow from said internal fluid passage of said major diameter portion to said face outlet of said tip.

8. A machining method using a cylindrical rotating tool, said method comprising a step of machining a workpiece by rotating said cylindrical rotating tool according to claim 1.

* * * * *

UNITED STATES PATENT AND TRADEMARK OFFICE
CERTIFICATE OF CORRECTION

PATENT NO. : 8,393,830 B2
APPLICATION NO. : 12/882603
DATED : March 12, 2013
INVENTOR(S) : Morihiro Hideta It is certified that error appears in the above-identified patent and that said Letters Patent is hereby corrected as shown below:

On the Title Page:

Please correct the following to (73) Assignee:

Mori Seiki Co., Ltd., Yamatokoriyama-shi (JP)

Signed and Sealed this
Fifth Day of November, 2013

Teresa Stanek Rea
*Deputy Director of the United States Patent and Trademark Office*